(12) United States Patent
Itoh et al.

(10) Patent No.: US 7,499,045 B2
(45) Date of Patent: Mar. 3, 2009

(54) GRAPHICS IMAGE GENERATION

(75) Inventors: Takayuki Itoh, Yokohama (JP);
Yasumasa Kajinaga, Yokohama (JP);
Yuhko Tsukagoshi, Yokohama (JP);
Yumi Yamaguchi, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 632 days.

(21) Appl. No.: 10/487,009

(22) PCT Filed: Jul. 25, 2002

(86) PCT No.: PCT/JP02/07575

§ 371 (c)(1),
(2), (4) Date: Feb. 2, 2005

(87) PCT Pub. No.: WO03/015032

PCT Pub. Date: Feb. 20, 2003

(65) Prior Publication Data

US 2005/0237320 A1    Oct. 27, 2005

(30) Foreign Application Priority Data

Aug. 1, 2001    (JP) .............................. 2001-233922

(51) Int. Cl.
*G06T 11/20*    (2006.01)
(52) U.S. Cl. ....................... 345/418; 715/243
(58) Field of Classification Search ........................ None
See application file for complete search history.

(56) References Cited

U.S. PATENT DOCUMENTS 5,381,523 A * 1/1995 Hayashi ...................... 715/204
5,912,668 A * 6/1999 Sciammarella et al. ...... 715/788
5,943,679 A * 8/1999 Niles et al. .................. 715/247

(Continued)

FOREIGN PATENT DOCUMENTS

JP    08-110847    4/1996

(Continued)

OTHER PUBLICATIONS

Altman, Rebecca, "Visual QuickStart Guide PowerPoint 2000/98," May 1999, Peachpit Press, Chapter 7, Level 1, Section 7.*

*Primary Examiner*—Kee M Tung
*Assistant Examiner*—Andrew Yang

(57) ABSTRACT

A graphics image generation apparatus includes element arrangement means for, based on hierarchical data, arranging figures which indicate constituent elements on a lower hierarchy level than a constituent element on a predetermined level of the hierarchical data, in a figure region which indicates the constituent element on the predetermined level; and arrangement control means for generating a graphics image of the hierarchical data by causing the element arrangement means to recursively perform arrangement of figures for each hierarchy level from a lower hierarchy level to a higher hierarchy level of the hierarchical data. The arrangement of figures is accomplished by a first step of establishing the center point of one of the figures and two further points distant from the one figure to serve as vertices for construction of one triangle of a triangle mesh, and a second step of locating a center point of the one triangle to enable a positioning of a further one of the figures along a line connecting the center point of the one triangle with a vertex of the one triangle.

26 Claims, 32 Drawing Sheets

U.S. PATENT DOCUMENTS 6,249,902 B1 * 6/2001 Igusa et al. .................. 716/10

FOREIGN PATENT DOCUMENTS

| | | | |
|---|---|---|---|
| JP | 8-110847 A | 4/1996 | |
| JP | 11-085837 | 3/1999 | |
| JP | 11-85837 A | 3/1999 | |
| JP | 11-250272 | 9/1999 | |
| JP | 11-250272 A | 9/1999 | |

* cited by examiner

DUMMY VERTEX  CENTER POINT 501
502

(B)

PLACE NEW RECTANGLE
AT ANY OF THESE POSITIONS (A)

(B)

(A)

(B)

(C)

(D)

(E)

(A)

(B)

(C)

FIG. 16
FIG. 16A
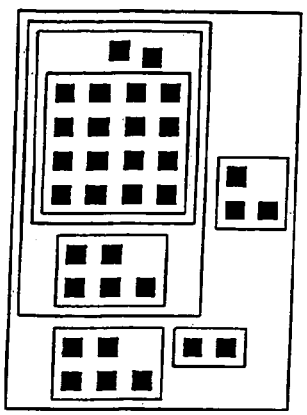
FIG. 16B
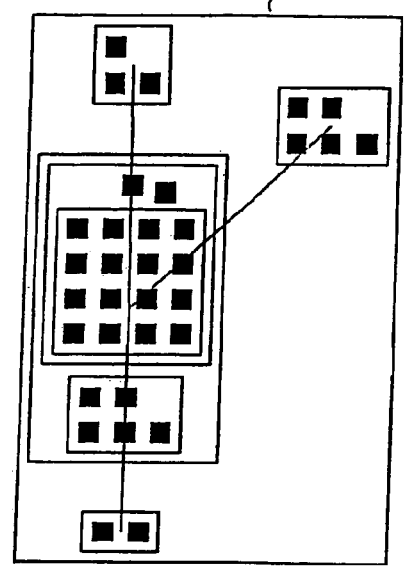
FIG. 16C
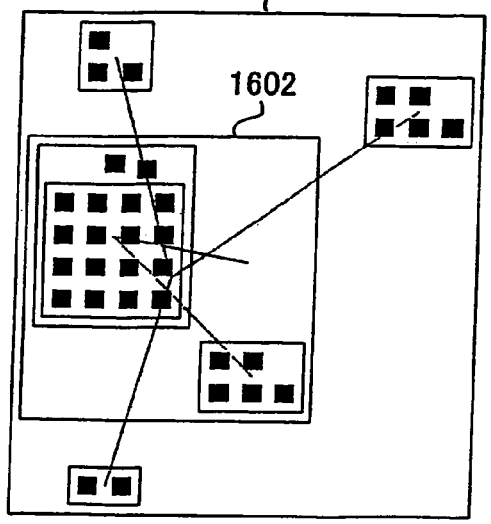
FIG. 16D
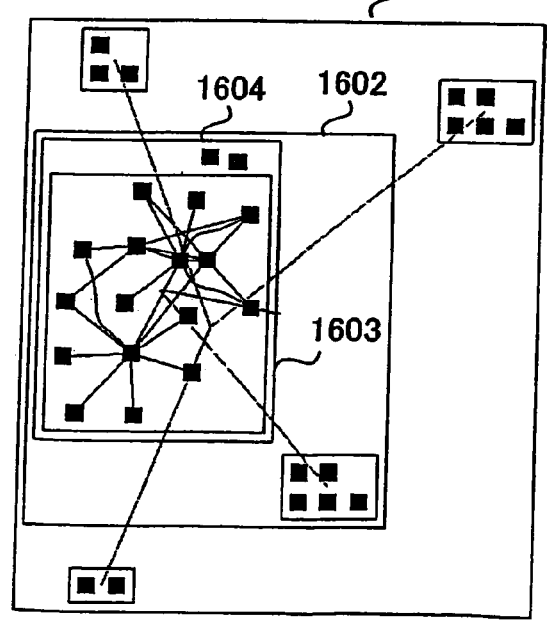

FIG. 31
FIG. 31A
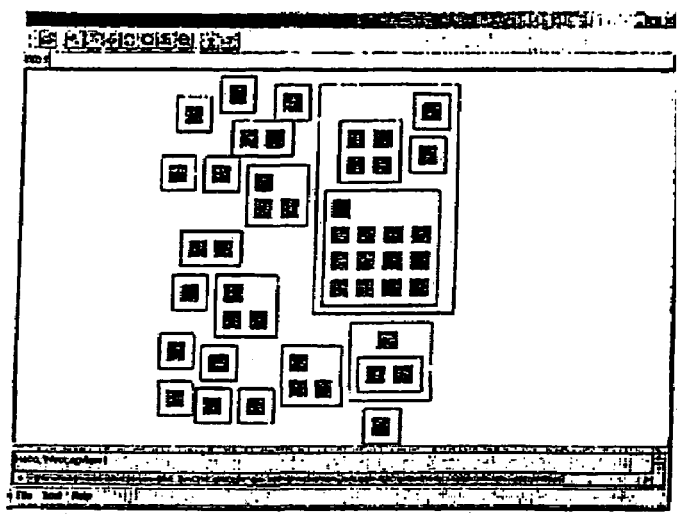
FIG. 31B
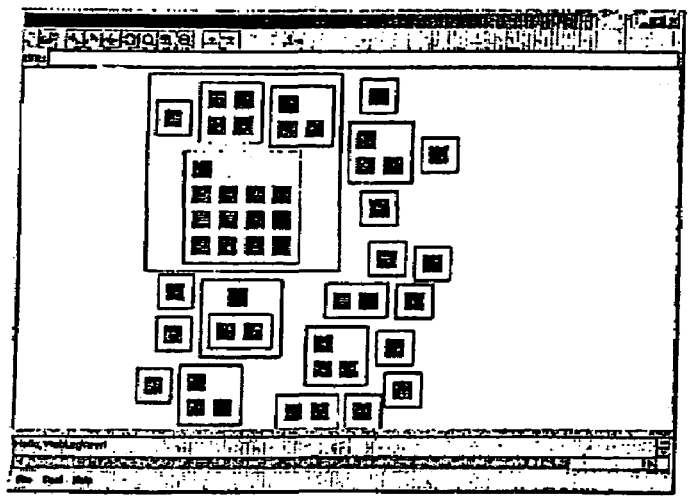
FIG. 31C
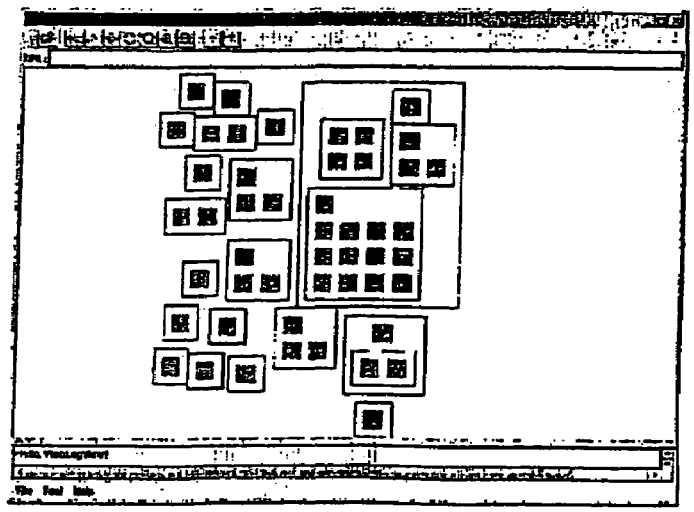

FIG. 35
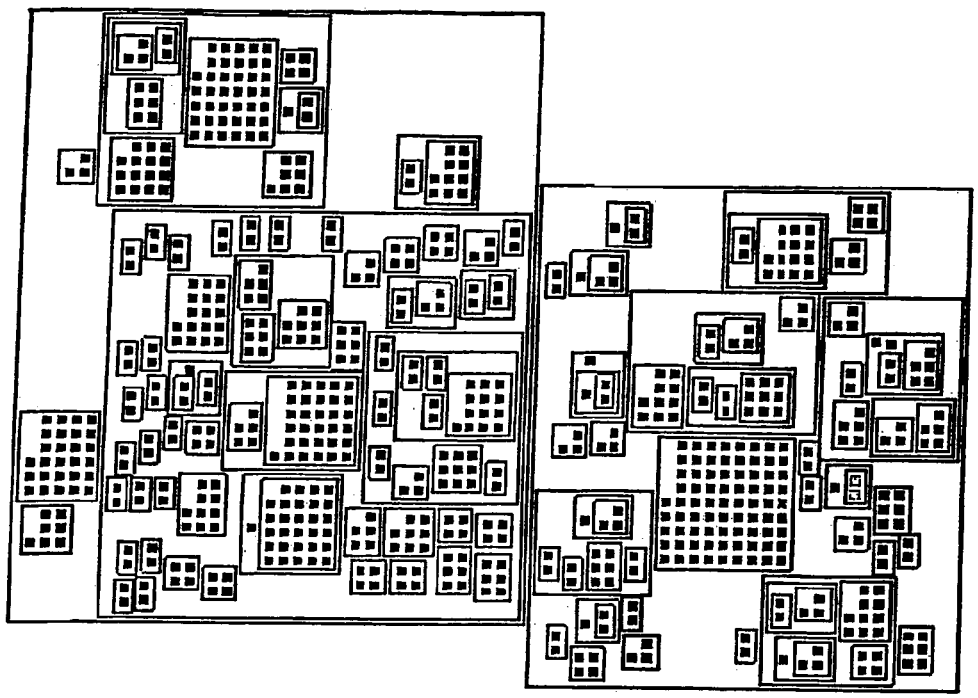
FIG. 35B
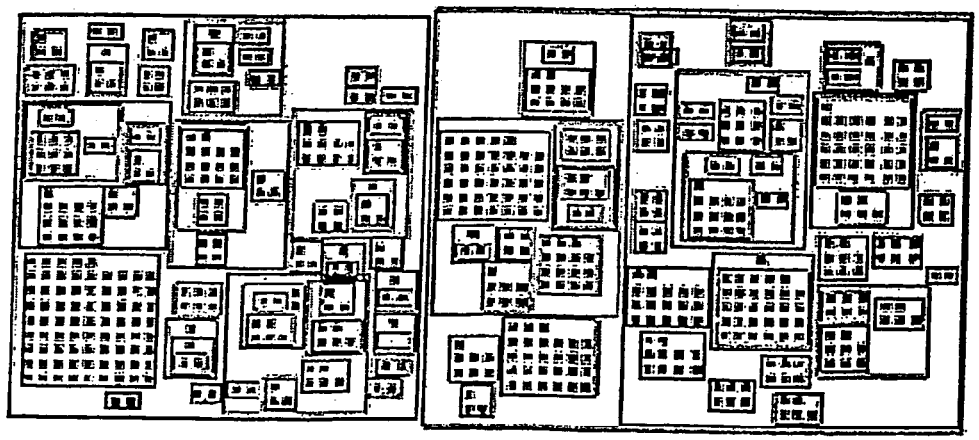
FIG. 35A

GRAPHICS IMAGE GENERATION

TECHNICAL FIELD

The present invention relates to a graphics display technology to generate a graphics image of hierarchical data.

BACKGROUND ART

Various technologies have been proposed, which visualize a set of a plurality of elements while reflecting relationships between the elements, by using a computer. As this type of technology, there is a technology which graphically displays data including a plurality of data elements organized with a hierarchy structure (hereinafter, referred to as hierarchical data).

Conventionally, in the technology of graphically displaying this type of hierarchical data in real time, the hierarchy structure has been displayed, in general, by use of a tree structure. For example, Explorer, which is a file operating system running on Windows, the operating system by Microsoft Corporation, U.S., displays the hierarchy structure of a file system by using a simple tree structure, in which data elements are arranged in a row and arcs are placed between the data elements.

However, since this is a simple method of just arranging data elements in a row, in the case of graphically displaying large-scale hierarchical data including thousands to tens of thousands of data elements, it is difficult to display a large quantity of information on a screen.

As a method of displaying hierarchical data more suitable for large-scale data than Explorer, Treemap method and Hyperbolic Tree method are conceived.

The Treemap method expresses a hierarchy structure of data by splitting a screen space on which the hierarchical data is displayed in alternating vertical and horizontal directions and making the split regions correspond to individual data elements. This Treemap method is described in detail, for example, in the following literature 1.

literature 1: Shneiderman B., Tree visualization with treemaps: a 2-d space-filling approach, ACM Transactions on Graphics, vol. 11, 1 (January 1992), 92-99. or http://www.cs.umd.edu/hcil/treemaps/

In the Hyperbolic Tree method, a tree structure is arranged in a hyperbolic space. The following literature 2 discloses a method applying this Hyperbolic Tree method to express both a hierarchy structure and a link structure between data elements.

literature 2: Hao M. C., Hsu M., Dayal U., and Krug A., Web-based Visualization of Large Hierarchical Graphs Using Invisible Links in a Hyperbolic Space, HP Laboratories Palo Alto, HPL-2000-2.

FIG. 36 is a view showing an example of displaying hierarchical data using the technology disclosed in the literature 2.

Referring to FIG. 36, arcs are radially extended from the highest hierarchy level toward lower hierarchy levels. Individual data elements placed at the lowest hierarchy level are finally arranged at the outermost periphery.

Incidentally, as a method of visualizing a hierarchy structure of hierarchical data, a method is conceived, which combines regions (rectangular regions, for example) which are made to correspond to hierarchy levels, in a nested manner for a graphics display. Specifically, an individual region is set for each classification of data elements constituting the hierarchy structure, and the data elements are arranged in the regions.

In this case, if all the data elements arranged in a predetermined region are expressed by cells in the same shape and of the same size, the data elements can be arranged by just arraying the cells. However, when the meanings and contents of the data elements are reflected on the shapes and sizes of the cells, it becomes a problem how efficiently the cells are arranged in the region.

If the regions and the cells are expressed by rectangles, this problem comes to a problem that "a set composed of rectangles of arbitrary sizes is arranged in the minimum rectangular region." This problem is called Packing, Nesting, Marking, or the like, and applied in fields of arranging VLSIs (Very Large Scale Integrated Circuit) on a board, arranging patterns of clothes, arranging mechanical parts on a plate, and the like. Various techniques have been presented to solve this problem in these fields.

As described above, the technique for expressing a hierarchy structure by use of a tree structure has hitherto been used as the technique for graphically displaying hierarchical data.

However, it has been difficult for the simple tree structure, in which data elements are arrayed in a row and arcs are placed between the data elements, to display all the data elements of large-scale hierarchical data on a screen.

The Treemap method disclosed in the literature 1 is a technique suitable for large-scale hierarchical data to graphically display hierarchical data in comparison with the above described simple tree structure. However, when thousands to tens of thousands of data elements are displayed, the regions of minimum units which are made to correspond to the data elements are excessively fine, and the visibility thereof is lowered.

Similarly, even in the technique disclosed in the literature 4 using the Hyperbolic Tree method, which is considered to be suitable for the graphics display of relatively large-scale hierarchical data, the individual data elements on the lowest hierarchy level are arranged in the periphery of a radial tree structure. Accordingly, it is difficult to display thousands to tens of thousands of data elements.

Furthermore, any of these technologies for graphically displaying hierarchical data using a tree structure expresses a hierarchy structure related to classification of data elements by use of the tree structure. Therefore, the hierarchy structure is easily recognized, but in the case where there is any relationship (link structure) between the individual data elements, it is difficult to display this link structure by means of placing arcs or the like.

Moreover, in the case of using the method of performing a graphics display with nested regions as a technique for visualizing the hierarchy structure of hierarchical data, as previously described, it is required to solve the problem that a set composed of cells of arbitrary sizes are arranged in a minimum region. There have already been various techniques for solving this problem. However, most thereof are optimization techniques for minimizing an arrangement region, in other words, technologies of "minimizing the arrangement region regardless of the length of calculation time (even with a long calculation time)."

However, when this problem is tried to be solved as part of the technology of graphically displaying hierarchical data, it is required to reduce the calculation time (for example, a few seconds, a time period to allow an interactive operation) and to obtain, even if not optimal, a proper arrangement result to a certain degree.

In this connection, an object of the present invention is to provide a technique for easily generating a graphics image of large-scale hierarchical data.

Another object of the present invention is to provide a technique for rapidly performing processing of efficiently arranging elements of arbitrary sizes in a predetermined region.

SUMMARY

The aspects of ths disclosed embodiments provide a graphics image generation apparatus characterized by being configured as follows. Specifically, this graphics image generation apparatus includes element arrangement means for, based on hierarchical data, arranging figures which indicate constituent elements on a lower hierarchy level than a constituent element on a predetermined level of the hierarchical data, in a figure region which indicates the constituent element on the predetermined level; and arrangement control means for generating a graphics image of the hierarchical data by causing the element arrangement means to recursively perform arrangement of figures for each hierarchy level from a lower hierarchy level to a higher hierarchy level of the hierarchical data. The arrangement of figures is accomplished by a first step of establishing the center point of one of the figures and two further points distant from the one figure to serve as vertices for construction of one triangle of a triangle mesh, and a second step of locating a center point of the one triangle to enable a positioning of a further one of the figures along a line connecting the center point of the one triangle with a vertex of the one triangle.

In another aspect, the disclosed embodiments are directed to a graphics image generation apparatus which generates a graphics image including figures arranged within a predetermined region. In one embodiment, the apparatus includes sort means for sorting figure data to be arranged based on a figure area; and element arrangement means for sequentially arranging figures based on the figure data from a center of the region to a periphery thereof in sort order obtained by the sort means. The arranging of figures is accomplished by a first step of establishing the center point of one of the figures and two further points distant from the one figure to serve as vertices for construction of one triangle of a triangular mesh, and a second step of locating a center point of the one triangle to enable a positioning of a further one of the figures along a line connecting the center point of the one triangle with a vertex of the one triangle.

In a further aspect, the aspects of the disclosed embodiments are directed to a graphics image generation apparatus that includes graphics image generation means for receiving hierarchical data and generating image data of a graphics image which expresses a hierarchy structure of the hierarchical data by use of a nested structure of two-dimensional figures; storage means for storing the image data of the graphics image of the hierarchical data, the image data being generated by the graphics image generation means; and display means for reading the image data from the storage means and displaying the read image data. The generating of image data is accomplished by a first step of establishing the center point of one of the figures and two further points distant from the one figure to serve as vertices for construction of one triangle of a triangular mesh, and a second step of locating a center point of the one triangle to enable a positioning of a further one of the figures along a line connecting the center point of the one triangle with a vertex of the one triangle.

In yet another aspect, the disclosed embodiments are directed to a graphics image generation apparatus that generates a graphics image including figures arranged within a predetermined region. In one embodiments the apparatus includes position information holding means for holding information concerning arrangement positions of figures, the information being created based on a graphics image already generated; and element arrangement means for arranging the figures in the region based on the information, held in the position information holding means, concerning the arrangement positions of the figures such that the figures to be arranged do not overlap each other. The arranging of figures is accomplished by a first step of establishing the center point of one of the figures and two further points distant from the one figure to serve as vertices for construction of one triangle of a triangular mesh, and a second step of locating a center point of the one triangle to enable a positioning of a further one of the figures along a line connecting the center point of the one triangle with a vertex of the one triangle.

In another aspect, the disclosed embodiments are directed to a graphics image generation apparatus which generates a graphics image including figures arranged with a predetermined region. In one embodiment the apparatus includes position information holding means for holding information and element arrangement means for arranging the figures in the region based on the information, held in the position information holding means, concerning the arrangement positions of the figures such that the figures to be arranged do not overlap each other. The arranging of figures is accomplished by a first step of establishing the center point of one of the figures and two further points distant from the one figure to serve as vertices for construction of one triangle of a triangular mesh, and a second step of locating a center point of the one triangle to enable a positioning of a further one of the figures along a line connecting the center point of the one triangle with a vertex of the one triangle.

In a further aspect, the disclosed embodiments are directed to a graphics image generation apparatus that generates a graphics image including figures arranged within a predetermined region. In one embodiment the apparatus includes position information holding means for holding information concerning arrangement positions of figures created based on predetermined coordinate axes which expresses meanings of data by a positional relationship; and element arrangement means for arranging the figures in the region based on the information, held in the position information holding means, concerning the arrangement positions of the figures such that the figures to be arranged do not overlap each other. The arranging of figures is accomplished by a first step of establishing the center point of one of the figures and two further points distant from the one figure to serve as vertices for construction of one triangle of a triangular mesh, and a second step of locating a center point of the one triangle to enable a positioning of a further one of the figures along a line connecting the center point of the one triangle with a vertex of the one triangle.

In a further aspect, the disclosed embodiments are directed to a graphics image generation method of generating a graphics image including figures within a predetermined region by controlling a computer. In one embodiment the method includes reading figure data to be arranged from a storage unit storing the figure data, sorting the figure data based on figure areas, and storing the sorted figure data in sort result storing means; generating triangular mesh in the region; reading a sort order of the figure data from the sort result storing means, sequentially setting figures based on the figure data as objects to be arranged in accordance with the sort order, determining arrangement positions of the figures based on triangular elements of the triangular mesh, and arranging the figures as the objects to be arranged at the arrangement positions; and storing a graphics image obtained by arranging the figures in the region into image data storing means; wherein the determining of arrangement positions of the figures is accomplished by a first step of establishing the center point of one of the figures and two further points distant from the one figure to serve as vertices for construction of one triangle of a triangular mesh, and a second step of locating a center point of the one triangle to enable a positioning of a further one of the figures along a line connecting the center point of the one triangle with a vertex of the one triangle.

In one embodiment, a graphics image generation method of generating a graphics image including figures arranged within a predetermined region by controlling a computer includes reading figure data to be arranged from a storage unit storing the figure data, sorting the read figure data on the basis of a predetermined rule based on previously specified arrangement positions of figures, and storing the sorted figure data in sort result storing means; generating triangular mesh in the region; reading a sort order of the figure data from the sort result storing means, sequentially setting figures based on the figure data as objects to be arranged in accordance with the sort order, determining arrangement positions of the figures based on the previously specified arrangement positions of the figures and triangular elements of the triangular mesh, and arranging the figures as the objects to be arranged at the arrangement positions; and storing a graphics image obtained by arranging the figures in the region into image data storing means. The determining of arrangement positions of the figures is accomplished by a first step of establishing the center point of one of the figures and two further points distant from the one figure to serve as vertices for construction of one triangle of a triangular mesh, and a second step of locating a center point of the one triangle to enable a positioning of a further one of the figures along a line connecting the center point of the one triangle with a vertex of the one triangle.

In a further aspect, the disclosed embodiments are directed to a storage medium having a program capable of controlling a computer to generate a graphics image. In one embodiment, the program can cause the computer to execute processing of receiving hierarchical data and staking constituent elements of the hierarchical data into data storing means based on a hierarchy structure of the hierarchical data; processing of recursively executing, from a lower hierarchy level to a higher hierarchy level of the hierarchical data, processing of sequentially reading the constituent elements stacked in the data storing means and arranging figures indicating constituent elements on a lower hierarchy level than the read constituent elements in a figure region which indicate the read constituent elements; and processing of storing a graphics image of the hierarchical data obtained by recursively executing arrangement of the figures, into image data storing means. The executing of an arrangement of the figures is accomplished by a first step of establishing the center point of one of the figures and two further points distant from the one figure to serve as vertices for construction of one triangle of a triangular mesh, and a second step of locating a center point of the one triangle to enable a positioning of a further one of the figures along a line connecting the center point of the one triangle with a vertex of the one triangle.

BRIEF DESCRIPTION OF THE DRAWINGS

FIGS. 16A to 16D are views showing how the arcs are generated for graph data generated by a sort section, an element arrangement section, and an arrangement control section;

FIGS. 31A to 31C are views showing states where predetermined hierarchical data are graphically displayed according to this embodiment;

FIGS. 35A and 35B are views showing examples of graphics images generated for two slightly different types of hierarchical data without using the template.

BEST MODES FOR CARRYING OUT THE INVENTION

Hereinafter, the present invention will be described in detail based on first to third embodiments shown in the accompanying drawings.

First, the overview of the present invention will be described. The present invention generates a graphics image of hierarchical data by using a computer system. As a method of expressing the hierarchical data, the present invention uses a technique of two-dimensionally expressing the hierarchical data by combining regions indicating hierarchy levels in a nested manner.

The procedure of generating a graphics image of a nested structure is as follows. Data elements on a lowest hierarchy level are arranged in a space where the graphics image is generated (space displayed on a display device, hereinafter, referred to as a display space). Subsequently, a region including a set of the data elements is formed to express a higher hierarchy level by one level. Sets of the thus obtained regions are properly rearranged in the display space, and a larger region including the sets of these regions is formed to express a further higher hierarchy level by one level. Such a process is recursively repeated to express hierarchy levels of the hierarchical data up to the highest level.

Specifically, in the present invention, the graphics image of the hierarchical data is generated by sequentially arranging the hierarchical data from the lower hierarchy level to the higher hierarchy level.

The first embodiment is a system which generates the graphics image of hierarchical data as described above. The second embodiment is a system which graphically displays graph data with a hierarchy structure by expressing relationships between constituent elements on a predetermined hierarchy level by use of a link structure with arcs, using the technology of generating a graphics image. The third embodiment is a system which intentionally controls the arrangement of the constituent elements in the graphics image to a certain extent by using a template.

Hereinafter, each embodiment will be described in detail.

First Embodiment

Figure 1:
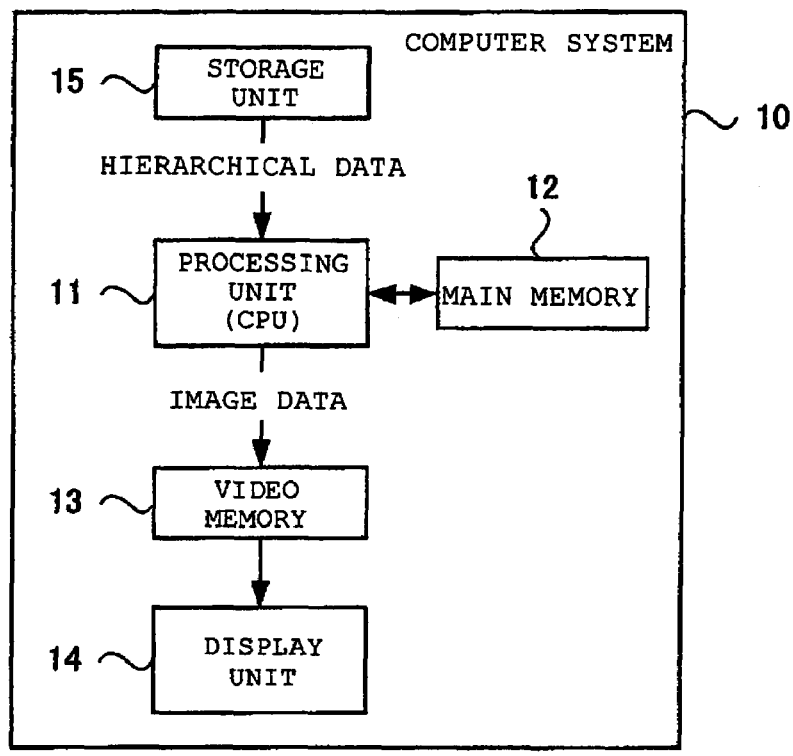
FIG. 1 is a diagram showing a configuration of a computer system as a graphics image generation apparatus according to a first embodiment of the present invention.

FIG. 1 is a diagram showing the configuration of a computer system as a graphics image generation apparatus which graphically displays graph data according to the first embodiment.

Referring to FIG. 1, a computer system 10 includes a processing unit (CPU) 11, a main memory 12, a video memory 13, a display unit 14, and a storage unit 15. The processing unit 11 executes a graphics display process by program control. The main memory 12 stores a program controlling the processing unit 11. With the video memory 13 and the display unit 14, a graphics image of hierarchical data generated by the processing unit 11 is displayed. The storage unit 15 stores the hierarchical data to be processed.

The processing unit 11 is controlled by the program stored in the main memory 12 to read hierarchical data to be processed from the storage unit 15, generates a graphics image (image data) thereof, and stores the graphics image in the video memory 13. The graphics image stored in the video memory 13 is displayed on the display unit 14. The main memory 12 is used as a stack temporarily storing undermentioned cells and clusters in a process of graphics image generating processing by the processing unit 11.

Note that FIG. 1 shows only the configuration for implementing this embodiment. Practically, it is obvious that input units, such as a keyboard and a mouse, for inputting various instructions and data, a voice output mechanism, various peripheral units, and an interface for a network are provided in addition to the configuration shown in the drawing. The hierarchical data may be inputted from the outside via the network, as well as read from the storage unit 15 as described above.

Figure 2:
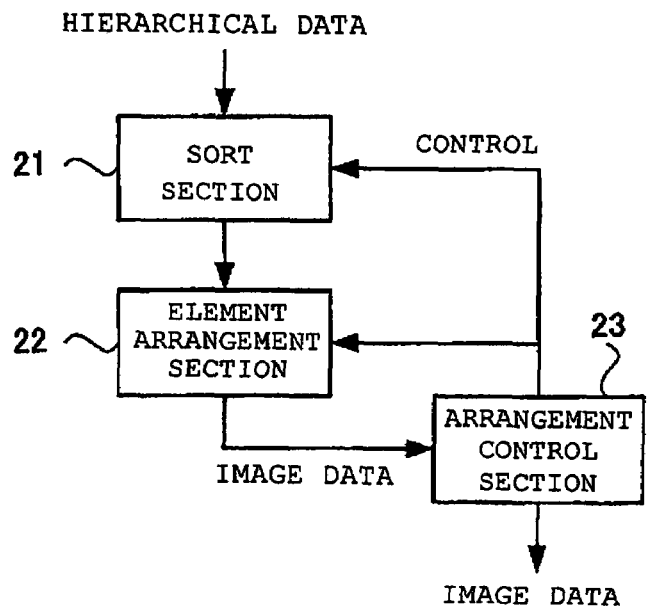
FIG. 2 is a diagram illustrating a configuration of the graphics image generation apparatus according to the first embodiment of the present invention.

FIG. 2 shows a diagram illustrating the configuration of the graphics image generation apparatus which generates a graphics image of hierarchical data according to the first embodiment.

As previously described, in the first embodiment, the graphics image of hierarchical data is generated by a technique of combining regions indicating hierarchy levels in a nested manner. In this graphics image, individual data elements in the hierarchical data are referred to as cells and expressed by squares of the same size. Constituent elements on higher hierarchy levels indicating classification of the data elements or the like are referred to as clusters and expressed by rectangles including cells and clusters on lower hierarchy levels. In other words, the graphics image is composed of a single rectangular cluster or multiply-arranged rectangular clusters and square cells arranged in the cluster or the clusters. However, in a stage of generating this graphics image, the cells and the clusters are just figure data of squares and rectangles. Therefore, the cells and the clusters can be treated in the same manner. Accordingly, in the description below, the cells and the clusters are collectively referred to as constituent elements when there is no need to distinguish the cells from the clusters.

Moreover, the description below will be mainly given of a case of arranging the rectangular clusters which can have various sizes in this embodiment. However, the cells and the clusters are treated without being distinguished as previously described, and it is obvious that a similar explanation can be given when the cells are not limited to the same size.

Referring to FIG. 2, the graphics image generation apparatus according to this embodiment includes a sort section 21, an element arrangement section 22, and an arrangement control section 23. The sort section 21 determines the arrangement order concerning the constituent elements on each hierarchy level in the hierarchical data to be processed. The element arrangement section 22 arranges the constituent elements of the hierarchical data according to the order determined by the sort section 21. The arrangement control section 23 causes the sort section 21 and the element arrangement section 22 to recursively perform the arrangement processing of the constituent elements of the graph data sequentially from the lowest hierarchy level of the graph data.

Each component shown in FIG. 2 is a virtual software block implemented by the processing unit 11 which is controlled by the computer program held in the main memory 12 of FIG. 1. The computer program controlling the processing unit 11 is provided by being stored in a storage medium such as a CD-ROM or a floppy disk to be distributed or by being transmitted via a network. The computer program is loaded in the main memory 12 and controls the processing unit 11 to implement a function of each component shown in FIG. 2 in the computer system 10 shown in FIG. 1.

In the configuration shown in FIG. 2, in the case of arranging clusters or cells on a lower hierarchy level than a predetermined cluster within a rectangle indicating the predetermined cluster, the arrangement order of the clusters or cells is determined (sorted).

The arrangement order is determined, as a rule, such that the rectangles are sequentially arranged in descending order of size. In this embodiment, since the cells corresponding to the data elements are squares of the same size, the arrangement order can arbitrarily be determined. However, in the case of employing a display technique for reflecting the contents of the data elements on the sizes of the cells, the arrangement order is similarly determined according to the sizes of the cells. A sort result showing the arrangement order of the clusters or cells are temporarily stored in the main memory 12 or a resistor in the processing unit 11.

In the case of visualizing a set of data elements, there are many requirements for arranging highly related data close to each other. Therefore, the sort section 21 is designed to modify the arrangement order of the clusters in descending order of area based on a predetermined condition. Concrete processing of arranging the highly related data close to each other is related to processing by the element arrangement section 22 and will be described later.

The element arrangement section 22 arranges the clusters or the cells of the hierarchical data in the display space in the order sorted by the sort section 21. The arrangement manner is based on the following policies.

(1) The clusters or the cells are sequentially arranged from the center of the display space so as to be adjacent to a rectangle already arranged.

(2) When a cluster or a cell can be arranged in a gap between rectangles already arranged, the cluster or the cell is arranged in the gap.

In this embodiment, processing using triangular mesh which connects the center points of the rectangles is performed in order to implement processing of searching at high speed for a gap where a rectangle can be arranged, which is required in the policy (2). This triangular mesh satisfies the Delaunay condition.

In this embodiment, the constituent elements of the hierarchical data are sequentially arranged from a lower hierarchy level to a higher hierarchy level. Accordingly, when the element arrangement section 22 arranges a cluster on a predetermined level, clusters or cells on the lower levels than the relevant cluster have already been arranged. Therefore, in arranging a predetermined cluster, the element arrangement section 22 retains relative positional relationships between a rectangle indicating the relevant cluster and rectangles or squares indicating clusters or cells on the lower levels which have already been arranged within the relevant cluster. In other words, the element arrangement section 22 handles a combination of these figures as a figure to arrange the same.

The arrangement control section 23 generates a graphics image of the entire hierarchical data by causing the sort section 21 and the element arrangement section 22 to recursively repeating, from the lower hierarchy level to the higher hierarchy level, the processing of arranging the clusters or cells, which is performed for each level of the hierarchical data. The generated graphics image is stored in the video memory 13 shown in FIG. 1 and displayed on the display unit 14.

Next, a description will be given of processing of generating a graphics image of hierarchical data based on the above described configuration.

First, a detailed description will be given of search for an arrangement position of a rectangle (cluster) by using the triangular mesh.

In this embodiment, when several rectangles have already been arranged, a group of rectangles is arranged in a small arrangement area by repeating processing of detecting a region where the arranged rectangles are sparse and of placing a next rectangle in the detected region. Therefore, in order to extract the region where the rectangles are sparse, the triangular mesh which connects the center points of the rectangles already arranged is generated in a region where the rectangles are to be arranged (hereinafter, referred to as an arrangement region). In a region where a larger triangular element is generated in this triangular mesh, the rectangles are more likely to be sparse, and therefore a new rectangle is attempted to be placed in this region. As a criterion for judging the sizes of the triangular elements, used are a radius of a circumscribed circle, a radius of an inscribed circle, and a maximum total length of three sides of each triangular element. Hereinafter, description will be give taking as an example the case where the size of each triangular element is judged using the radius of a circumscribed circle as a criterion.

This arrangement region is a region which is to be a rectangle expressing a cluster on a hither hierarchy level than the rectangles (clusters) to be arranged (in this meaning, the arrangement region is referred to as a figure region). Accordingly, four dummy vertices are initially placed at proper positions in the display space to set the rectangular region as the arrangement region, and triangular mesh is then generated. Since no rectangles has placed at this time, the triangular mesh is generated such that the rectangular arrangement region is separated into two triangles. Subsequently, each time another rectangle is arranged, the triangular mesh is made finer while adding the center of the rectangle as a new vertex.

In the initial state, since there is no rectangle already arranged, a rectangle which is the first to be placed can be arranged at an arbitrary position in the arrangement region. In this case, the first rectangle is placed in the center of the arrangement region indicated by the dummy vertices according to the aforementioned policy (1).

Figure 3:
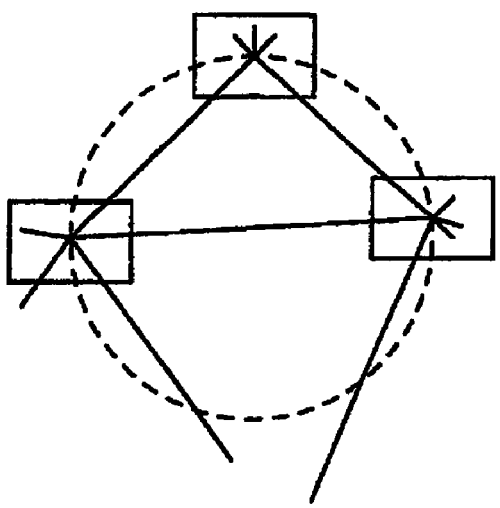
FIG. 3 is a view showing a circumscribed circle of a triangular element in triangular mesh.

FIG. 3 is a view showing a circumscribed circle of a predetermined triangular element which connects the center points of the already arranged rectangles, in the triangular mesh.

In the triangular mesh satisfying the Delaunay condition, there is no vertex of another triangular element within the circumscribed circle indicated by a dashed line in FIG. 3. Accordingly, it is presumed that the density of vertices of the triangular elements is low in the vicinity of a triangular element whose circumscribed circle is large. In a predetermined region, the lower density of vertices of the triangular elements means a fewer rectangles.

Figure 4:
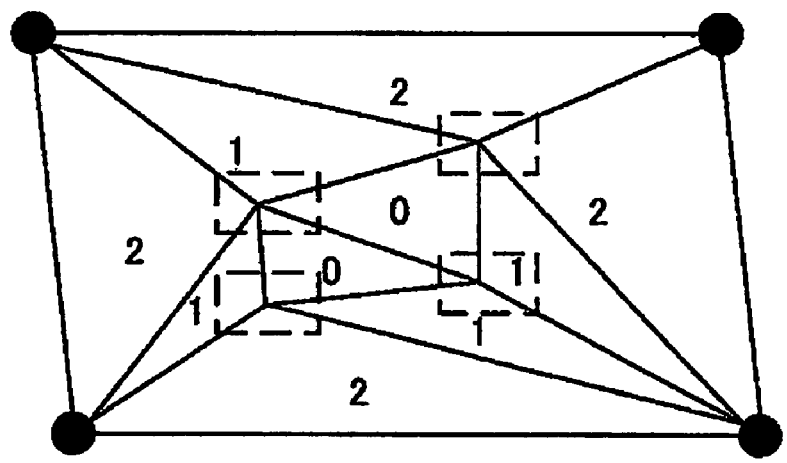
FIG. 4 is a view showing a state where triangular elements of the triangular mesh are classified by the number of adjacent dummy vertices.

FIG. 4 is a view showing classification of the triangular elements of the triangular mesh by the number of dummy vertices adjacent thereto.

Herein, the meaning of a dummy vertex adjacent to a triangular element is that a vertex of the triangular element corresponds to the dummy vertex. Accordingly, the number of dummy vertices adjacent to a triangular element is zero to three. With this principle, since the dummy vertices are on the outermost side of the triangular mesh, it can be found that the triangular element with more adjacent dummy vertices is on the outermost side of the region where the triangular mesh is generated, and the triangular element with fewer adjacent dummy vertices is on the inner side of the region. Accordingly, when rectangles are arranged at the positions of the triangular elements with as few adjacent dummy vertices as possible, the rectangles can be collectively arranged in a small space, and thus the arrangement region can be prevented from expanding.

Figure 5:
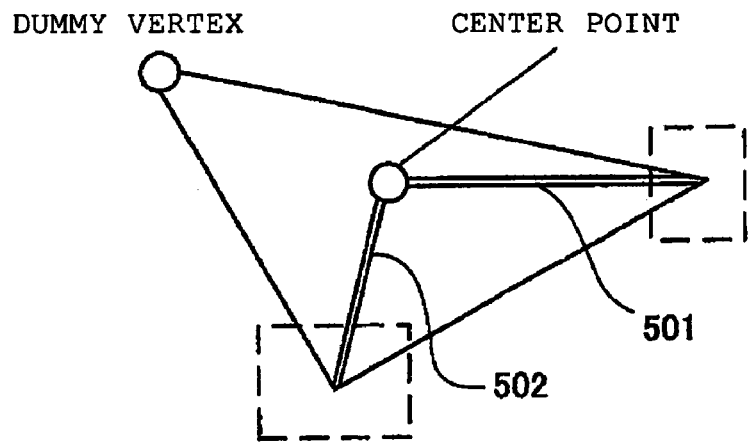
FIGS. 5A and 5B are views illustrating a technique for placing a rectangle in a triangular element selected as an object where the rectangle is placed.
Figure 5:
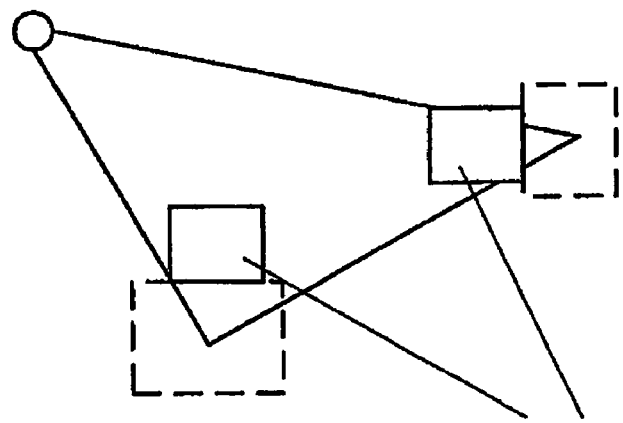

FIGS. 5A and 5B are views illustrating a technique for placing a rectangle in a triangular element selected as a target where the rectangle is to be arranged.

An example shown in FIGS. 5A and 5B illustrates processing in the case where the arrangement position of a rectangle is set in a triangular element in which two rectangles indicated by the dashed lines have already been arranged and which has one adjacent dummy vertex. In this case, the center point of the rectangle to be newly arranged is placed on a line segment (line segment 501 or 502 in FIG. 5A) connecting the center point of the selected triangular element and a vertex of the triangular element other than the dummy vertex, and at the same time the relevant rectangle to be newly arranged is adjacent to any one of the rectangles already arranged. The relevant rectangle is thus arranged. Specifically, the relevant rectangle is arranged at a position of one of two rectangles indicated by the solid lines in FIG. 5B.

Figure 6:
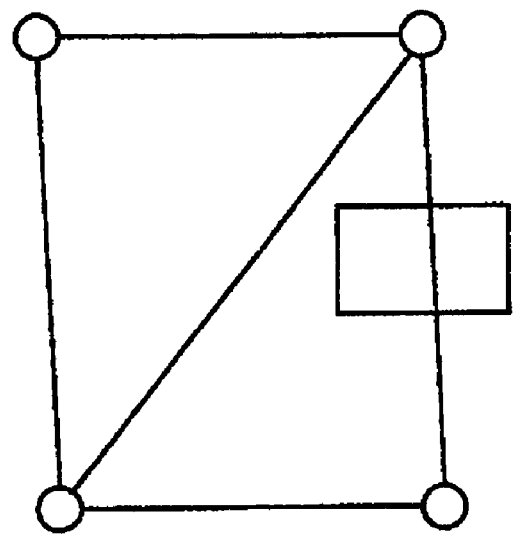
FIGS. 6A and 6B are views illustrating processing of moving dummy vertices and expanding an arrangement region to arrange a rectangle.
Figure 6:
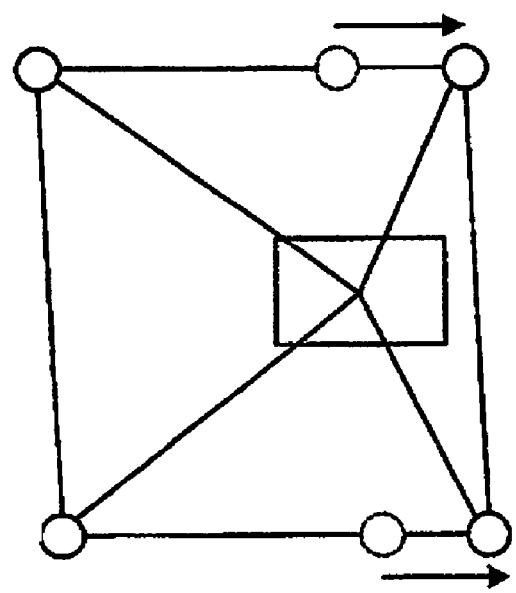

FIGS. 6A and 6B are views illustrating processing of moving dummy vertices and expanding an arrangement region to arrange a rectangle.

When a triangular element where the rectangle is to be placed cannot be detected within the arrangement region formed by the dummy vertices, and the rectangle protrudes from the arrangement region, in other words, when the rectangle is placed so as to cross a side whose both ends are the dummy vertices (see FIG. 6A), the dummy vertices are rearranged in a direction farther from the center of a screen space so that the rectangle is inside the triangular mesh (see FIG. 6B). Since the arrangement region is a rectangle indicating a cluster on a higher hierarchy level, if taking an account of the arrangement of clusters on the relevant higher hierarchy level also, the constituent elements of hierarchical data can be arranged in the display space more efficiently as the area of the arrangement region is smaller. Accordingly, it is required to devise the procedure of arranging rectangles in order to perform this processing of expanding the arrangement region as little as possible.

Next, description will be given of processing of arranging clusters by using the technique for searching for an arrangement position of a rectangle, which is described with reference to FIG. 3 to FIG. 6B.

Figure 7:
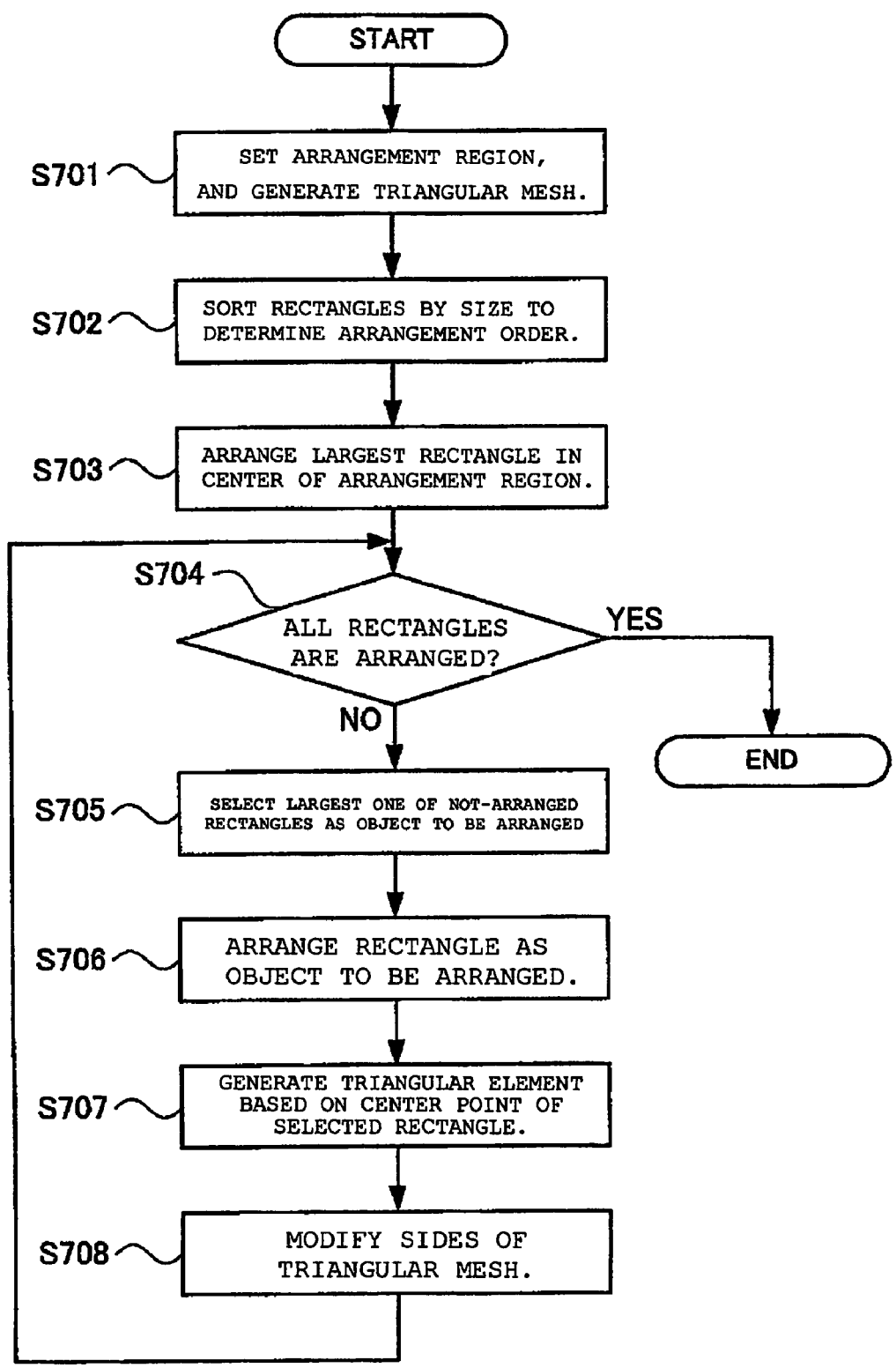
FIG. 7 is a flowchart illustrating an entire process of arranging a cluster on a predetermined hierarchy level according to this embodiment.
Figure 8:
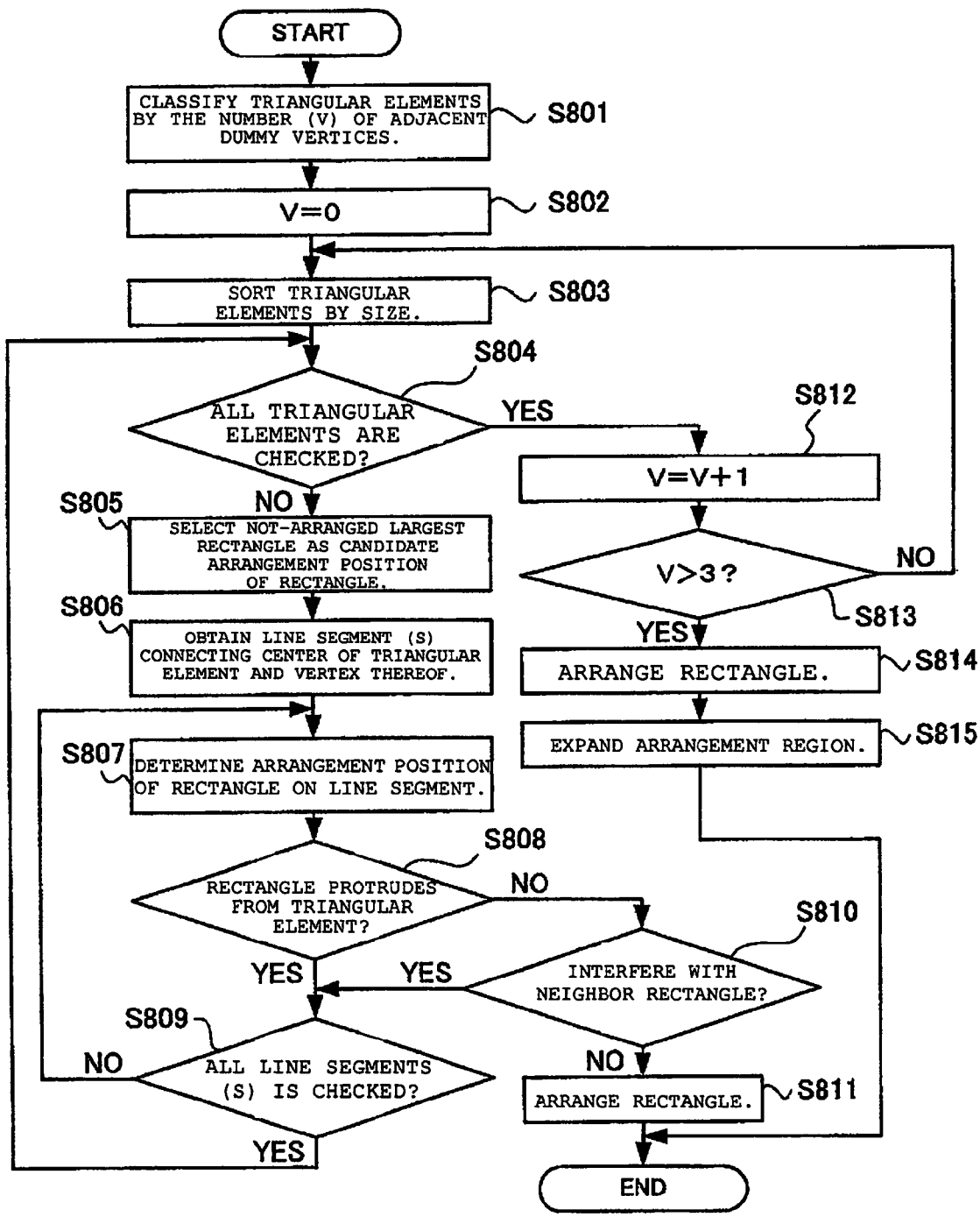
FIG. 8 is a flowchart illustrating a procedure of arranging the rectangle by using the triangular mesh according to this embodiment.
Figure 9:
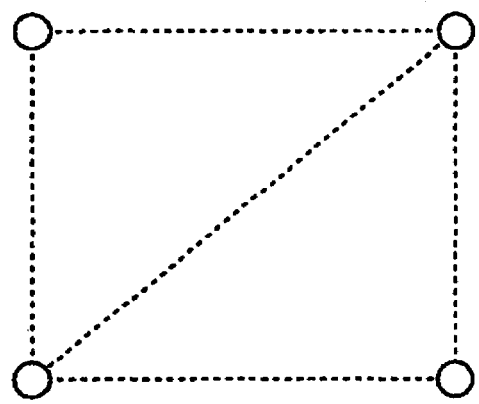
FIGS. 9A to 9E are views showing the arrangement of rectangles by using the triangular mesh according to this embodiment.
Figure 9:
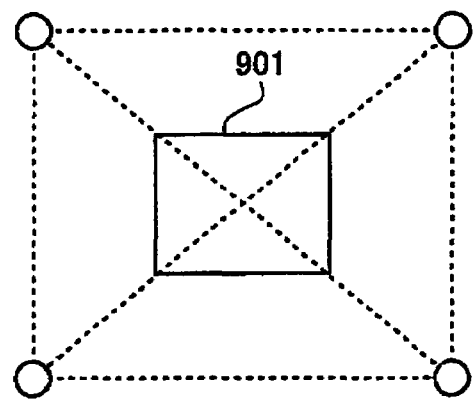
Figure 9:
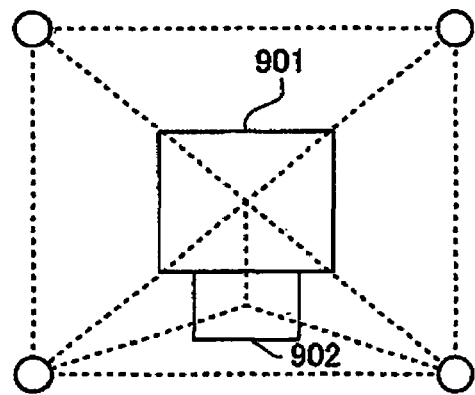
Figure 9:
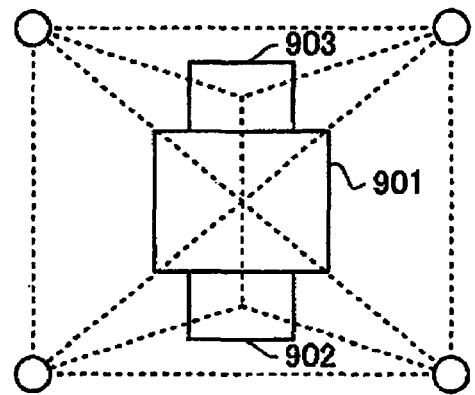
Figure 9:
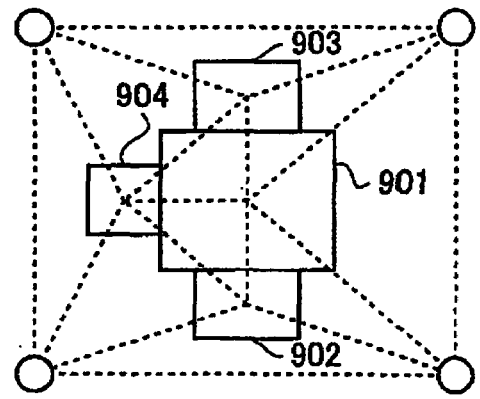
Figure 10:
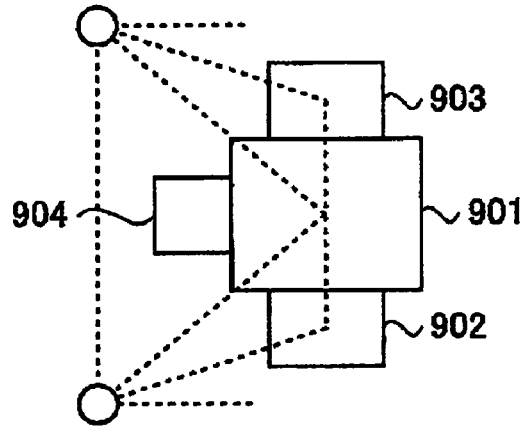
FIGS. 10A to 10C are views illustrating processing of updating the triangular mesh following the arrangement of a new rectangle according to this embodiment.
Figure 10:
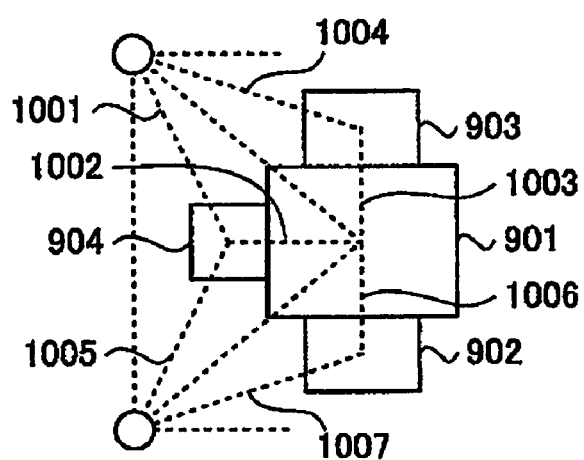
Figure 10:
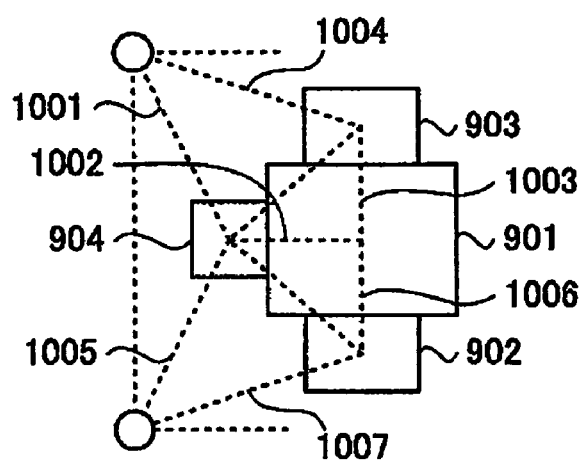

FIGS. 7 and 8 are flowcharts illustrating the processing of arranging clusters on a predetermined hierarchy level by the sort section 21 and the element arrangement section 22. FIGS. 9A to 9E are views showing the arrangement of rectangles by using the triangular mesh. FIGS. 10A to 10C are views illustrating processing of updating the triangular mesh following the arrangement of a new rectangle.

Referring to FIG. 7, first, the element arrangement section 22 properly arranges four dummy vertices (dummy nodes) in a display space to set an arrangement region, and then generates triangular mesh connecting these dummy vertices (step 701). FIG. 9A shows this initial arrangement region and the triangular mesh. At the time point of first setting the arrangement region, since any rectangle indicating a cluster has not been arranged yet, the size and the shape of the arrangement region can be arbitrarily set. At this time, for example, the arrangement region may be set based on information such as the number of clusters to be arranged or the hierarchy level in the hierarchical data on which the arrangement processing is being performed.

The sort section 21 sorts the rectangles of the clusters at the hierarchy level to be arranged in descending order of area and determines the arrangement order (step 702). The steps 701 and 702 may be performed in any order or in parallel.

Subsequently, the first rectangle (largest rectangle) in the arrangement order, which is determined in the step 702, is arranged in the center of the arrangement region set in the step 701 (step 703). The arrangement position thereof can be easily calculated, for example, based on the coordinates of the four dummy vertices and of the center point of the rectangle to be arranged. FIG. 9B shows a state where a rectangle 901 is arranged in the center of the arrangement region of FIG. 9A.

Subsequently, the rectangles are sequentially arranged within the arrangement region in accordance with the arrangement order determined in the step 702. First, it is checked whether all the rectangles sorted by the sort section 21 have been already arranged (step 704). If there are the rectangles which have not been arranged yet, the rectangle having the largest area thereamong is selected as an object to be arranged (step 705). Since the largest rectangle among the sorted rectangles has already arranged in the step 703, the rectangle after the second largest rectangle inclusive is selected. The selected rectangle is arranged based on the aforementioned technique for searching for an arrangement position of a rectangle by use of the triangular mesh (step 706). FIGS. 9C to 9E show the sequential arrangement of rectangles 902, 903, and 904 around the rectangle 901. This processing of arranging rectangles will be described in detail later.

After arranging the rectangle within the arrangement region, the element arrangement section 22 obtains the center point of the rectangle newly arranged and connects the center point with each vertex of the triangular element therearound to generate new triangular elements (step 707). Following the update of the triangular mesh, the element arrangement section 22 locally modifies the sides of the triangular mesh when needed (step 708). FIGS. 9B to 9E show states where, each time the new rectangle is arranged, the triangular elements are generated based on the new rectangle, and the triangular mesh is updated. In the Delaunay triangular mesh, the algorithm, as described above, for updating the triangular mesh each time another vertex is added is known as the incremental Delaunay triangulation and described, for example, in the following literature:

literature 3: Sloan S. W., A Fast Algorithm for Constructing Delaunay Triangulation in the Plane, Advances in Engineering Software, 9, 34-55, 1987.

FIGS. 10A to 10C show the update of the triangular mesh due to the new rectangle 904 which is arranged so as to be adjacent to the already arranged rectangle 901.

First, since the rectangle 904 is arranged as shown in FIG. 10A, the center point of the rectangle 904 comes to serve as new vertices to generate new triangular elements as shown in FIG. 10B. Subsequently, based on the above-mentioned incremental Delaunay triangulation, a side separating two triangular elements surrounded by sides 1001, 1002, 1003, and 1004 and a side separating two triangular elements surrounded by the side 1002 and sides 1005, 1006, and 1007 are modified as shown in FIG. 10C.

Thereafter, the element arrangement section 22 returns to the step 704, selects the next rectangle (next largest rectangle) in the order sorted by the sort section 21 as am object to be arranged (step 705), and repeats the same processing.

By repeating the above processing, the rectangles are arranged within the arrangement region in descending order of area.

Next, a detailed description will be given of the processing in which the element arrangement section 22 arranges the rectangle in the step 706 with reference to FIG. 8.

First, the triangular elements constituting the triangular mesh generated in the step 701 are classified by the number (V) of the dummy vertices adjacent thereto (step 801). As previously described, the number of the dummy vertices adjacent to each triangular element is zero to three, and therefore the triangular elements are classified into four groups.

Subsequently, the triangular elements with no (zero) adjacent dummy vertex are sorted in descending order of size (steps 802 and 803). Herein, the size of each triangular element can be judged, for example, by comparing the length of the radius of the circumscribed circle of the triangular element with each other as previously described. A sort result is temporarily stored, for example, in the main memory 12 or a register of the processing unit 11 shown in FIG. 1.

When there is a triangular element with no (zero) adjacent dummy vertex, the following series of processing is performed on the triangular elements in the order sorted in the step 803 (step 804).

First, the largest triangular element (first triangular element in the arrangement order sorted by size) among the unprocessed triangular elements is selected as a candidate for the arrangement position of the rectangle (step 805). Subsequently, a line segment (S) connecting the center point of the triangular element and a vertex thereof other than the dummy vertex is obtained (step 806). In the case of the triangular element with no (zero) adjacent dummy vertex, three line segments (S) are detected.

Subsequently, an arbitrary line segment on which no triangular element is placed is selected among the detected line segments (S). The arrangement position of the rectangle being processed is determined such that the center of the relevant rectangle being processed (to be arranged) is located on the selected line segment and the relevant rectangle being processed is adjacent to the already arranged rectangle (step 807). This arrangement position can be easily obtained based on the coordinate value of each rectangle or the like in the display space.

Subsequently, it is examined whether the rectangle being processed protrudes from the relevant triangular element when the relevant rectangle being processed is placed on the arrangement position obtained in the step 807 (step 808). In the case where the rectangle protrudes, if there is an unexamined line segment (S), the unexamined line segment is selected, and the processing returns to the step 807 to determine the arrangement position of the rectangle (steps 809 and 807).

In the case where the rectangle does not protrude from the triangular element, it is subsequently examined whether the relevant rectangle being processed interferes with (overlaps) the neighboring already arranged rectangles (step 810). If the rectangle does not interfere, the rectangle is arranged at the relevant position, and the processing is finished (step 811).

On the other hand, when the rectangle being processed interferes with the neighbor rectangles, if there is an unexamined line segment (S), the unexamined line segment is selected, and the processing returns to the step 807 to determine the arrangement position of the rectangle (steps 809 and 807).

When there is no unexamined line segment (S) in the step 809, in other words, when the judgment condition in the step 808 or 810 is not satisfied, specifically, the rectangle protrudes from the triangular element or interferes with the neighbor rectangles in the case where the rectangle being processed is arranged in the arrangement position of the rectangle which is obtained concerning all the line segments (S) obtained in the step 806, the processing returns to the step 804 and selects the next largest triangular element as a candidate of the arrangement position of the rectangle (steps 804 and 805). The processing after the step 806 is then repeated.

In the judgment of the step 804, when it is judged that all the triangular elements sorted in the step 803 have been examined (in this case, the arrangement position of the rectangle being processed has not been determined yet), or when there is no triangular element that satisfies the condition of the number of adjacent dummy vertices, the element arrangement section 22 next extracts triangular elements with the increased number of adjacent dummy vertices by one (at this time, one (=0+1) vertex) among the triangular elements classified by the number of adjacent dummy vertices (steps 812 and 813). The element arrangement section 22 again sorts the extracted triangular elements based on size (step 803), and repeats the processing after the step 804.

Furthermore, in the case where the arrangement position of the rectangle being processed has not been decided even when the number of adjacent dummy vertices is three after repeating the above processing, the element arrangement section 22 arranges the rectangle at a position which is obtained by the processing corresponding to the steps 806 and 807 and at which the rectangle protrudes from the arrangement region, in other words, the rectangle crosses the side whose both ends are dummy vertices (steps 813 and 814). Thereafter, as shown in FIGS. 6A and 6B, the positions of the dummy vertices are modified to expand the arrangement region, and the rectangle is accommodated within the arrangement region (step 815).

In the above described manner, in the arrangement region corresponding to a predetermined cluster, the rectangles, which are clusters on the lower hierarchy level than the predetermined cluster, are arranged by the sort section 21 and the element arrangement section 22. As described with reference to FIG. 7, the rectangles are arranged in descending order of area in principle (see step 702). However, as previously described, in order to arrange highly related data close to each other, it is possible to modify the arrangement order, and furthermore, it is possible to preferentially select a triangular element close to the center point of a rectangle which is highly related thereto and has been already arranged and to arrange the rectangle therein.

Specifically, in determining the arrangement order of the rectangles by the sort section 21, if the nth rectangle in the sort result based on size has k rectangles "which are highly related thereto and appear after the nth in the order," the order of the k rectangles are forced to change to the (n+1)th, (n+2)th, . . . and (n+k)th.

Subsequently, in arranging the (n+1)th, . . . and (n+k)th rectangles, whose order has been changed by the sort section 21, by the element arrangement section 22, a new rectangle is arranged in the vicinity of a rectangle which is related thereto and has been already arranged by using a topological distance from the relevant rectangle. For example, the case is considered, where a rectangle B is arranged in the vicinity of a rectangle A related to the rectangle B. In this case, the topological distances of triangular elements are recursively calculated in such a manner that a triangular element adjacent to the vertex of a triangular element at which the rectangle A is arranged is set to a distance 0, a triangular element adjacent to the triangular element is set to a distance 1, similarly, a distance 2, a distance 3 and so on. In the step 801 of FIG. 8, instead of classifying the triangular elements by the number of adjacent dummy vertices, the triangular elements are classified by the topological distance from the rectangle A, and sequentially searched for the arrangement position of the rectangle B beginning from a triangular element with the smallest topological distance. This enables the rectangle B to be arranged at the position as close as possible to the rectangle A.

The above described operations enables the related clusters to be arranged close to each other. Which clusters are related to each other can be identified by means of previously adding additional information to the hierarchical data or the like.

However, this technique is effective in the case where the number of clusters related to another cluster is smaller than the number of rectangles (clusters) to be arranged. Giving a concrete example, the technique is considered to be effective for data in which the number of clusters related to another cluster is not more than half the number of rectangles to be arranged, and the number of clusters related to one cluster is two or three at most.

When the number of clusters related to another cluster is larger than the number of rectangles (clusters) to be arranged, it is difficult to obtain an arrangement sufficiently expressing the relationships therebetween, and the time required for the arrangement processing is increased. In order to visualize the relationships between the clusters in such a case, it is preferable to employ a technique for connecting the clusters with arcs by using the later described technique for graph data, instead of this technique.

Next, description will be given of a method of generating a graphics image of hierarchical data by recursively performing the processing of arranging a rectangle by the sort section 21 and the element arrangement section 22.

Figure 11:
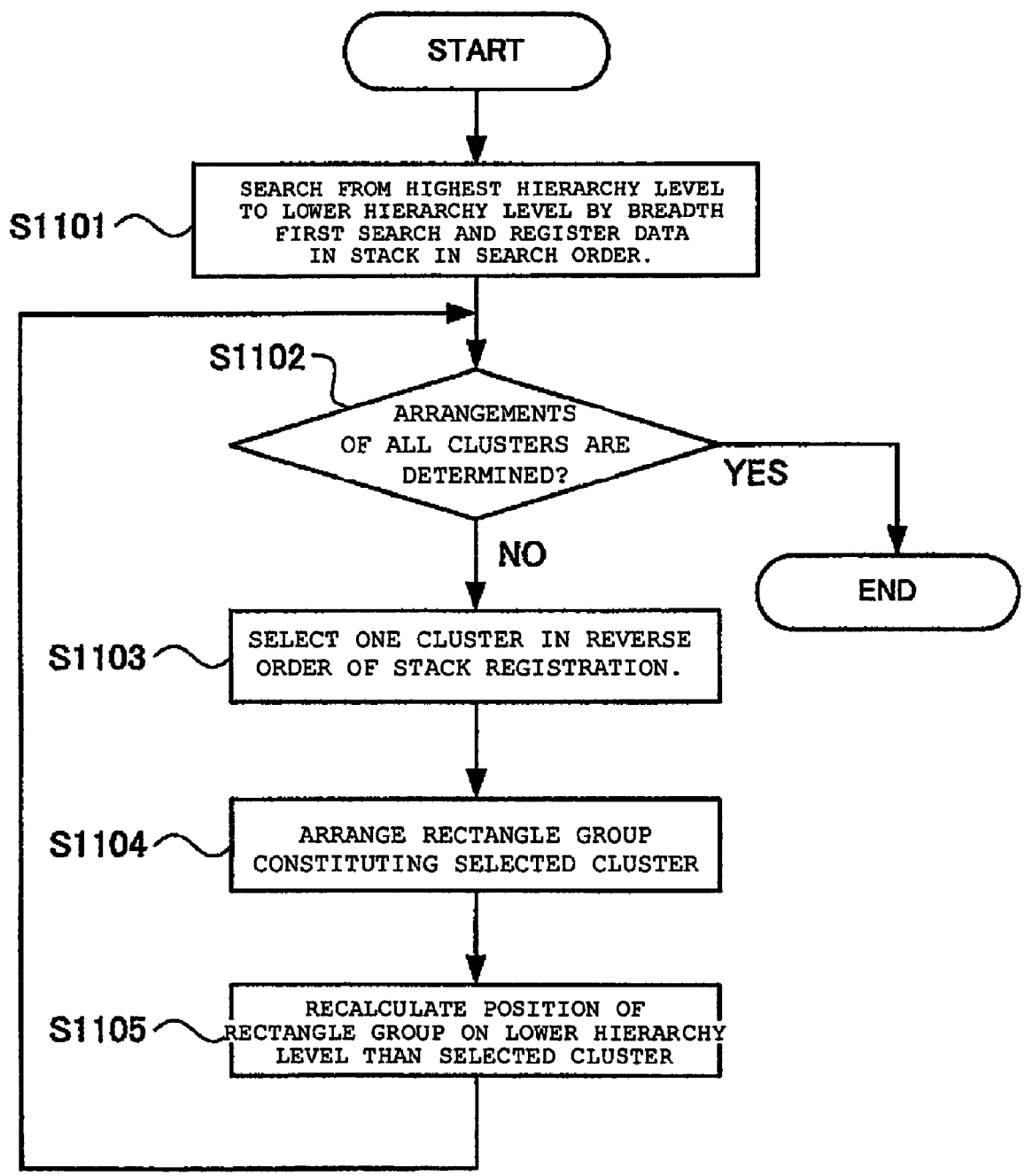
FIG. 11 is a flowchart illustrating a process of generating a graphics image of hierarchical data according to this embodiment.

FIG. 11 shows a flowchart illustrating processing of generating a graphics image of hierarchical data by control of the arrangement control section 23.

Referring to FIG. 11, first, the arrangement control section 23 sequentially searches for clusters on the highest hierarchy level of the hierarchical data down to clusters on the lowest hierarchy level by the breadth-first search, and registers the clusters in a stack in order of being detected (step 1101). This stack is set, for example, in the main memory 12 of FIG. 1 and can store the result of the above search.

Subsequently, the arrangement control section 23 selects a cluster in reverse order to the order of registration in the stack, and sets the cluster as the figure region to be processed (step 1102 and 1103). The arrangement control section 23 causes the sort portion 21 and the element arrangement section 22 to perform the processing of arranging rectangles (clusters on the lower hierarchy level than the clusters selected in the step 1103) in the figure region (step 1104). This is the processing previously described with reference to FIGS. 7 and 8.

This processing is recursively performed from the lower hierarchy level of the hierarchical data to the higher hierarchy level as previously described. Accordingly, when a rectangle (cluster) on a predetermined hierarchy level is arranged, rectangles on the lower hierarchy levels than the predetermined hierarchy level have been already arranged within the relevant rectangle. Therefore, after the processing of the step 1104 is finished, the positions of the rectangles at the lower hierarchy levels than the arranged rectangle are recalculated (step 1105).

After the above described processing, the arrangement control section 23 returns to the step 1102, selects the next cluster registered in the stack (step 1103), and repeats the same processing. When it is judged in the step 1102 that the arrangement of all the clusters registered in the stack is determined, the arrangement control section 23 finishes the processing and outputs the generated graphics image of the hierarchical data.

Figure 12:
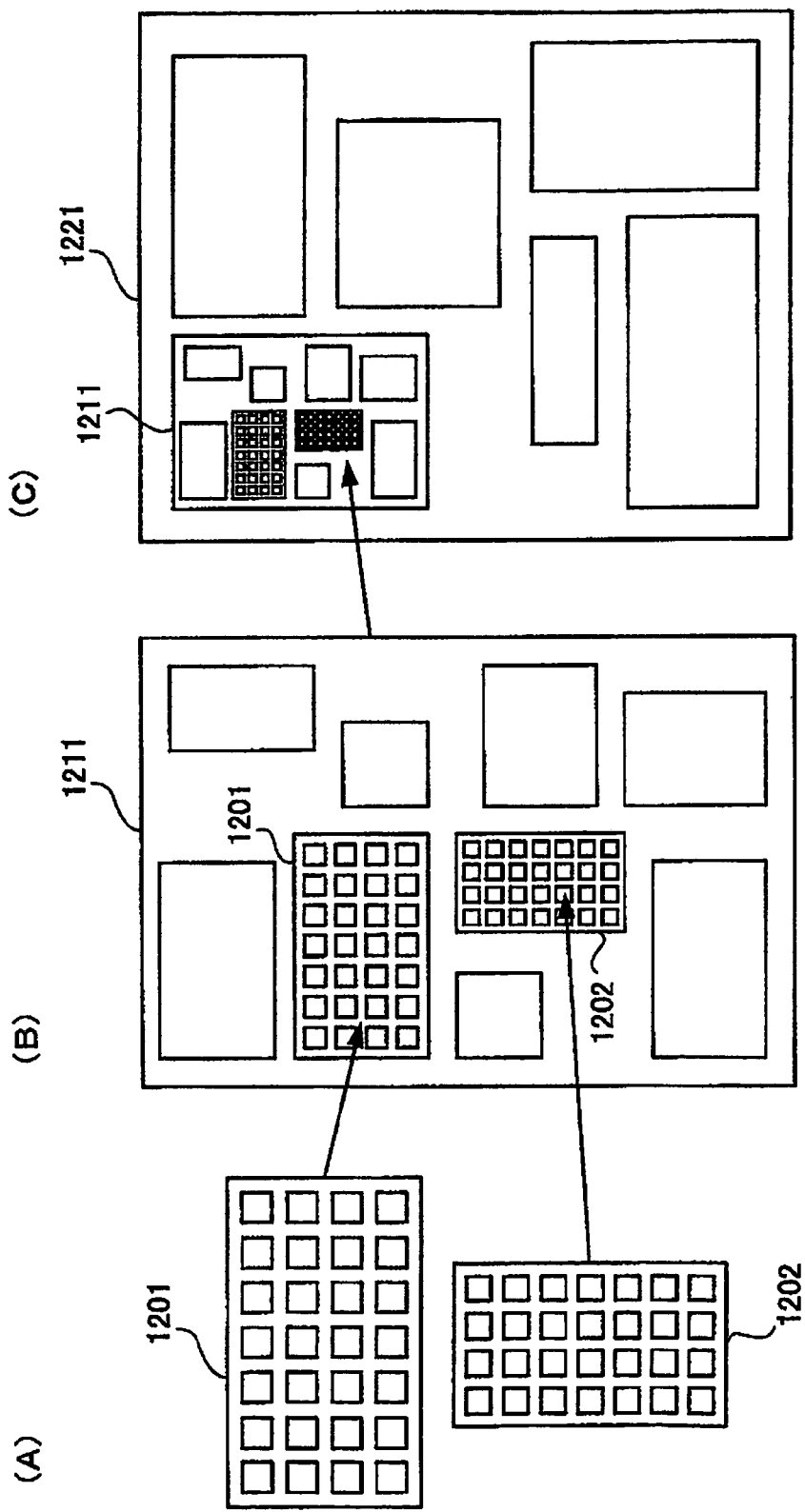
FIGS. 12A to 12C are views illustrating how constituent elements of hierarchical data are arranged for each hierarchy level, and the graphics image is generated according to this embodiment.

FIGS. 12A to 12C are views showing how the constituent elements of the hierarchical data are arranged for each hierarchy level by control of the arrangement control section 23, and a graphics image is generated.

Referring to FIGS. 12A to 12C, this hierarchical data has four hierarchy levels including data elements at the lowest hierarchy level. In FIG. 12A, square cells corresponding to the data elements are arranged within rectangles 1201 and 1202. In FIG. 12B, rectangles of clusters at the same hierarchy level as these rectangles 1201 and 1202 are arranged within a rectangle 1211 on the higher hierarchy level than the rectangles 1201 and 1202. In FIG. 12C, rectangles of clusters at the same hierarchy level as this rectangle 1211 are arranged in a rectangle 1221 at the highest hierarchy level.

Herein, a processing time in this embodiment will be considered.

The processing time when the sort section 21 and the element arrangement section 22 arrange n rectangles constituting a cluster is larger than O(n) in this embodiment. O(n) means that the calculation can be completed within a period of time equivalent to n multiplied by a constant (in this case, within a constant period of time since n is a constant). Therefore, the calculation time tends to rapidly increase with an increase in n. However, it is considered that there is no practical problem when n is about 500 to 1000.

Even in data in which n is thousands to tens of thousands, the following processing allows the processing time to be suppressed.

1. n data elements are distributed into several to several tens of virtual clusters.
2. The data elements are arranged for each virtual cluster, and then the groups of virtual clusters are arranged.
3. The virtual clusters are removed while the positions of the data elements therein are retained.

In the incremental Delaunay triangulation which updates triangular mesh each time a vertex is added, a processing time is generally $O(n^2)$ in the worst case. However, in the incremental Delaunay triangulation used in this embodiment, this processing time is considered to be shortened.

The normal incremental Delaunay triangulation generates triangular mesh by repeating the following processing as many times as the number of nodes:
1. A node is added.
2. A triangular element containing the node therein is detected.
3. Three sides which connect the three vertices of the detected triangular element and the node are generated to divide the triangular element into three.
4. Some sides with the surrounding triangular elements are modified to locally generate again the triangular elements.

At this time, the processing time for the step 2 is $O(n^2)$ in the worst case. However, in the incremental Delaunay triangulation applied in this embodiment, a particular triangular element is previously selected and a rectangle as a node is added within the selected triangular element. Accordingly, the detection processing of the step 2 is not required. In other words, the processing time for the triangular mesh in this embodiment depends on the processing time of the steps 3 and 4, which is smaller than $O(n^2)$. Accordingly, the processing time to generate the triangular mesh in this embodiment is smaller than $O(n^2)$.

Next, shown is an example of graphically displaying actual hierarchical data by applying this embodiment, which generates a graphics image of hierarchical data according to this embodiment.

Figure 13:
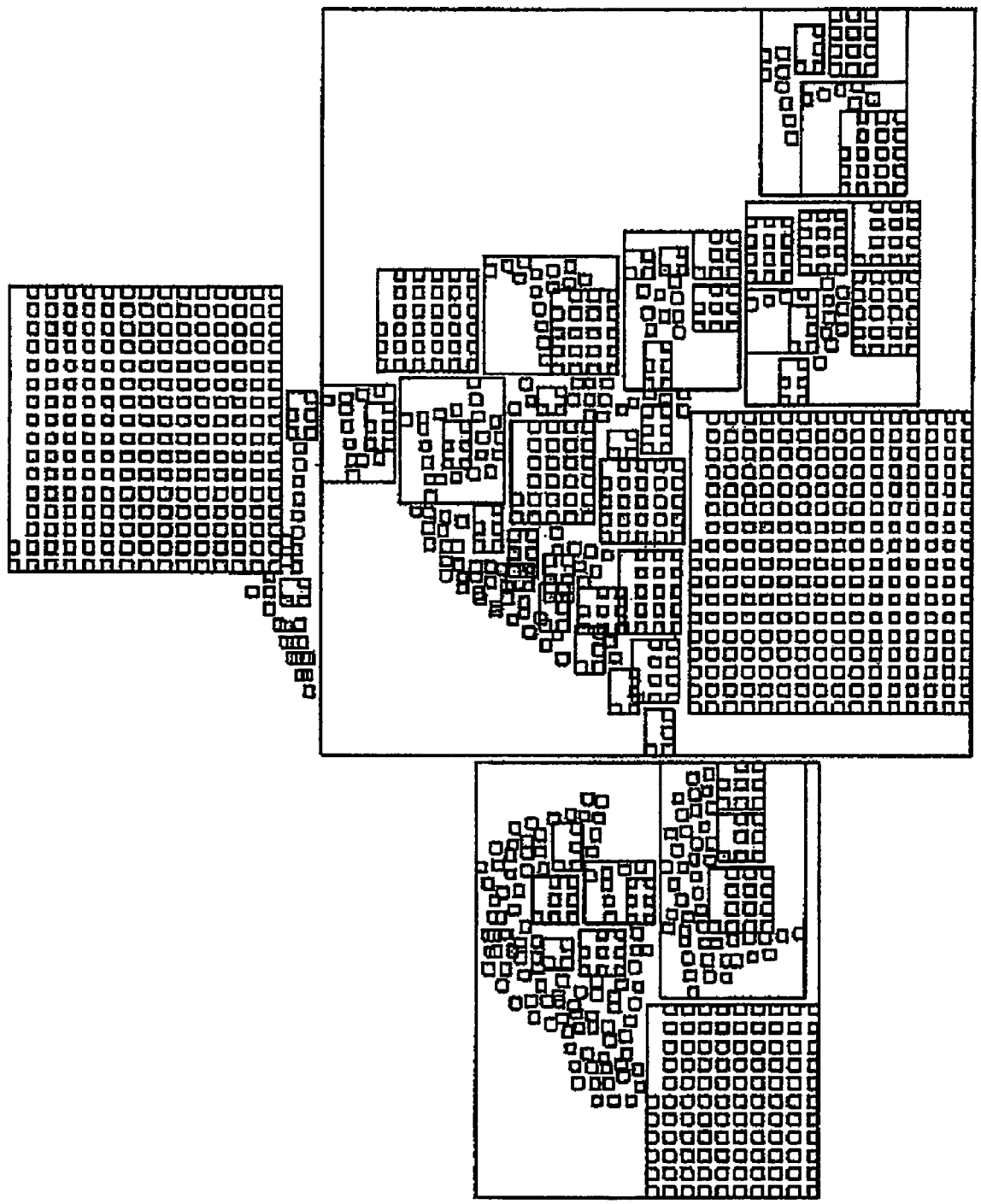
FIG. 13 is a view showing a state where Web pages are graphically displayed according to this embodiment by being handled as the hierarchical data based on URL (Uniform Resource Locators)

FIG. 13 is a view showing a state where Web pages under www.trl.ibm.com on the Internet are graphically displayed according to this embodiment by handling the Web pages as hierarchical data based on the URL (Uniform Resource Locators) thereof. In FIG. 13, the square cells indicate individual data elements, and the rectangles surrounding the square cells indicate clusters. Referring to the drawing, the hierarchy structure of the Web pages are displayed so as to facilitate visual understanding.

Second Embodiment

In the above described example, the description has been given of the technique for graphically displaying a hierarchy structure of the hierarchical data by use of the nested structure of the rectangular regions. However, it is further possible to express relationships between constituent elements on a predetermined hierarchy level by use of a link structure with arcs in the generated graphics image. In other words, a technique according to this embodiment can be used as preprocessing for the graphics display of graph data (graph data with a hierarchy structure) among the hierarchical data.

The second embodiment graphically displays graph data with a hierarchy structure by using the aforementioned technique.

Figure 14:
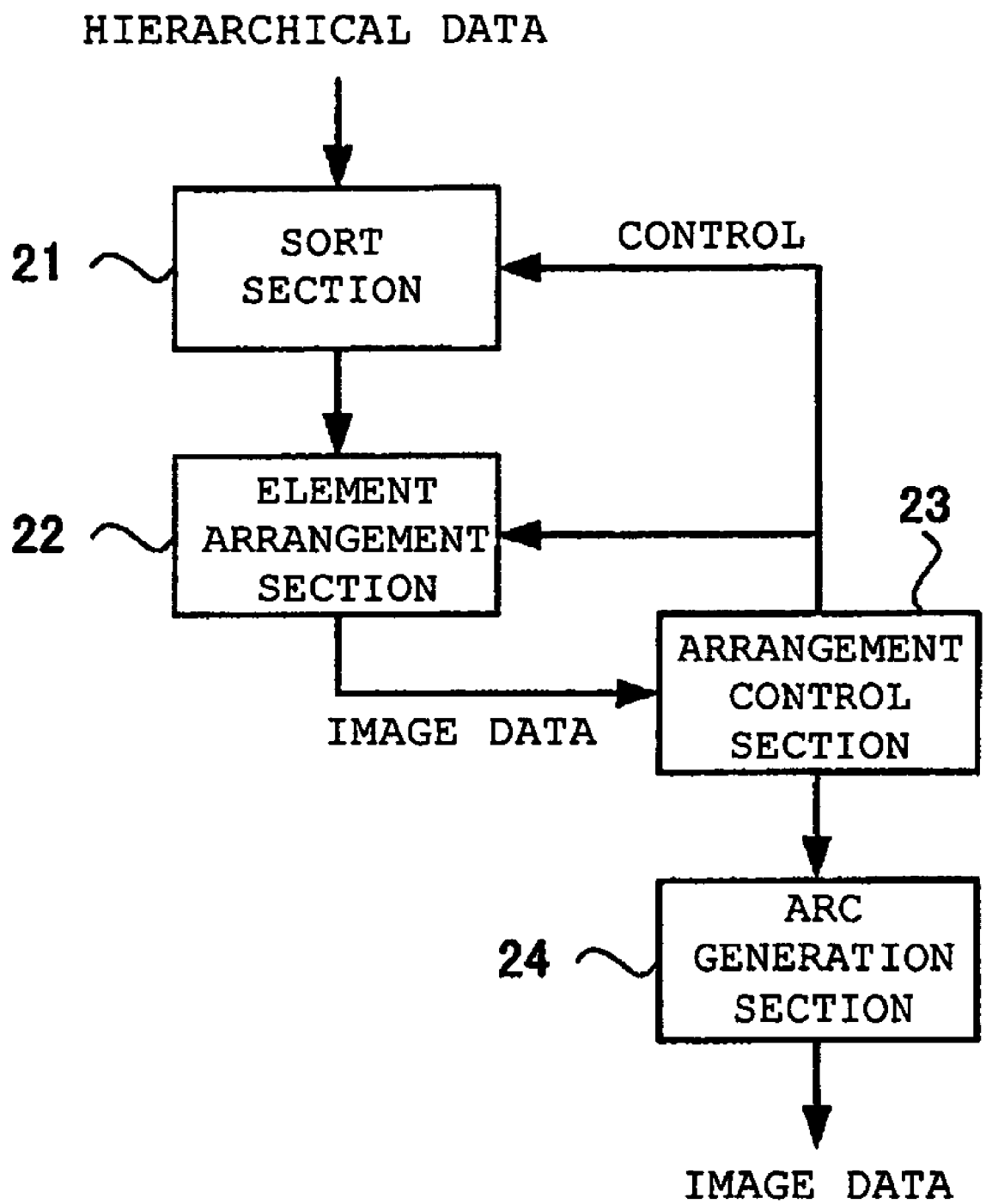
FIG. 14 is a diagram illustrating a configuration of a graphics image generation apparatus which generates a graphics image of graph data with a hierarchy structure according to the second embodiment of the present invention.

FIG. 14 is a diagram illustrating a configuration of a graphics image generation apparatus according to the second embodiment which generates a graphics image of graph data with a hierarchy structure.

The graphics image generation apparatus shown in FIG. 14 includes the sort section 21, the element arrangement section 22, the arrangement control section 23, and an arc generation section 24. The sort section 21 determines an arrangement order concerning the constituent elements of each hierarchy level in the graph data to be processed. The element arrangement section 22 arranges the constituent elements of the graph data in accordance with the order determined by the sort section 21. The arrangement control section 23 causes the sort section 21 and the element arrangement section 22 to recursively perform the arrangement processing of the constituent elements of the graph data sequentially from the lower hierarchy level of the graph data. The arc generation section 24 generates arcs connecting the constituent elements between the constituent elements in the graphics image generated by the control of the arrangement control section 23.

The graphics image generation apparatus shown in FIG. 14 is implemented by the computer system 10 shown in FIG. 1 similarly to the apparatus shown in FIG. 2 which generates a graphics image of hierarchical data. Specifically, each component shown in FIG. 14 is a virtual software block implemented by the processing unit 11 controlled by the computer program held in the main memory 12 of FIG. 1. The computer program is provided by being stored in a storage medium such as a CD-ROM or a floppy disk to be distributed or by being transmitted via a network. The computer program is loaded in the main memory 12 and controls the processing unit 11 to implement a function of each component shown in FIG. 14 in the computer system 10 shown in FIG. 1.

The sort section 21, the element arrangement section 22, and the arrangement control section 23 among the constituent elements shown in FIG. 14, are the same as the sort section 21, the element arrangement section 22, and the arrangement control section 23 shown in FIG. 2, respectively. Therefore, the same numerals are given thereto, and the description thereof is omitted.

The arc generation section 24 generates an arc for constituent elements within a rectangle specified by a user in the graphics image generated by the sort section 21 and the element arrangement section 22, and the arrangement control section 23 based on the relationship between the relevant constituent elements. The relationship between the constituent elements can be added in advance to the original graph data as additional information. As the technique for generating the arc, an existing technique used in the graphics display technology for this type of graph data can be employed.

In generating the arc, the arc generation section 24 can properly move the constituent elements such that the arc does not overlap another constituent element and another arc. In this case, the rectangle where the relevant constituent elements are arranged can be also expanded when needed. In the graph data with a hierarchy structure, the relevant rectangle is usually a constituent element of a rectangle on the higher hierarchy level. Therefore, when the rectangle is expanded, the arrangement of the constituent elements including the relevant rectangle is changed. In this case, it is required to properly move constituent elements around the relevant rectangle away from the rectangle.

Figure 15:
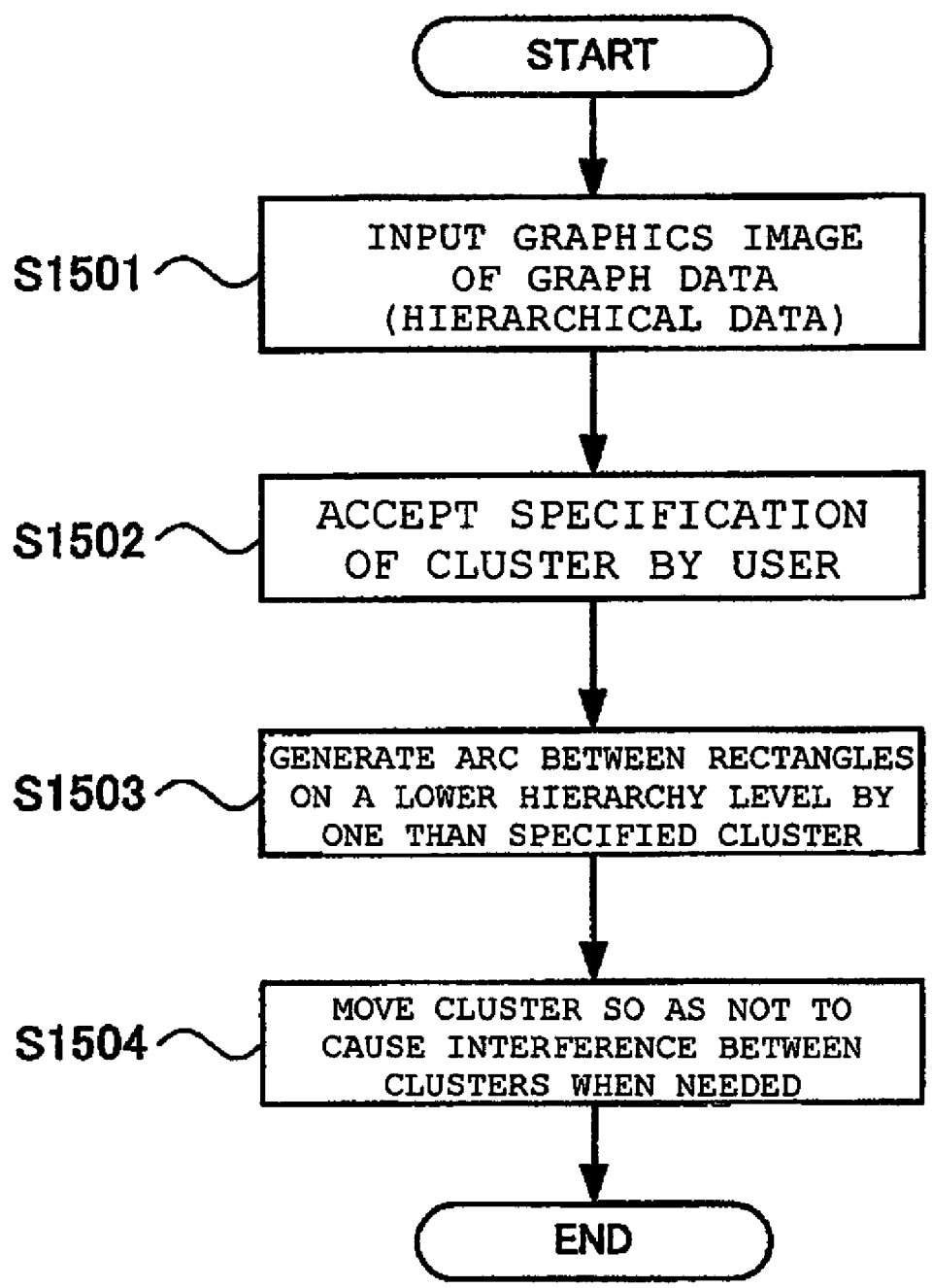
FIG. 15 is a flowchart illustrating the operation of generating an arc between constituent elements by an arc generation section.

FIG. 15 is a flowchart illustrating the operation of generating an arc between constituent elements of a predetermined cluster in graph data with a hierarchy structure in the arc generation section 24. FIGS. 16A to 16D are views showing how arcs are generated in graph data generated by the sort section 21, the element arrangement section 22, and the arrangement control section 23.

As shown in FIG. 15, the arc generation section 24 inputs a graphics image of the entire graph data generated by the sort section 21, the element arrangement section 22, and the arrangement control section 23 from the video memory 13 shown in FIG. 1 (step 1501). At this time, the graphics image is displayed on the display unit 14 shown in FIG. 1, and is in a state capable of accepting the specification of a cluster in which arcs are to be generated by GUI (Graphical User Interface). FIG. 16A shows a display example on the display unit 14 in this state. Referring to the same drawing, it is understood that this graph data includes five hierarchy levels.

Subsequently, the user specifies a desired cluster using an input device such as a mouse, and the arc generation section 24 accepts this input (step 1502).

The arc generation section 24 rearranges rectangles on the lower hierarchy level by one than the relevant cluster based on this specification, and generates arcs based on the relationships between the rectangles (clusters) (step 1503).

When the rectangle indicating the specified cluster is enlarged by the rearrangement of the rectangles, the arc generation section 24 moves the other clusters on the same hierarchy level as the relevant cluster such that the cluster does not interfere with the relevant other clusters (step 1504).

Lastly, the arc generation section 24 stores in the video memory 13 the graphics image in which the arcs have been generated in the above described processing. The graphics image is then displayed on the display unit 14.

FIG. 16B shows a result of the processing by the arc generation section 24 when a cluster 1601 (rectangle on the outermost side, which contains all the clusters) on the highest hierarchy level is specified by the user in the state of FIG. 16A. As shown in the drawing, arcs are generated between rectangles on the second hierarchy level, and the arrangement position of each rectangle is changed.

FIG. 16C shows a result of the processing by the arc generation section 24 when a cluster 1602 on the second hierarchy level is specified by the user in the state of FIG. 16B. As shown in the drawing, arcs are generated between rectangles within the rectangle (third hierarchy level) indicating the cluster 1602, and the arrangement positions of the rectangles are changed. Moreover, as a result of changing the arrangement positions of the rectangles on the third hierarchy level, the rectangle indicating the cluster 1602 is expanded. Accordingly, the arrangement positions of the other rectangles on the second hierarchy level are changed.

FIG. 16D shows a result of the processing by the arc generation section 24 when a cluster 1603 on the fourth hierarchy level is specified by the user in the state of FIG. 16C. As shown in the drawing, arcs are generated between square cells within the rectangle (fifth hierarchy level) indicating the cluster 1603, and the arrangement positions of the square cells are changed. With this change, the rectangle indicating the cluster 1604 on the fourth hierarchy level containing the square cells is expanded, and furthermore, the rectangle indicating the cluster 1602 on the third hierarchy level containing the rectangle indicating the cluster 1604 is expanded.

(Including Graph Data with a Hierarchy Structure)

Figure 17:
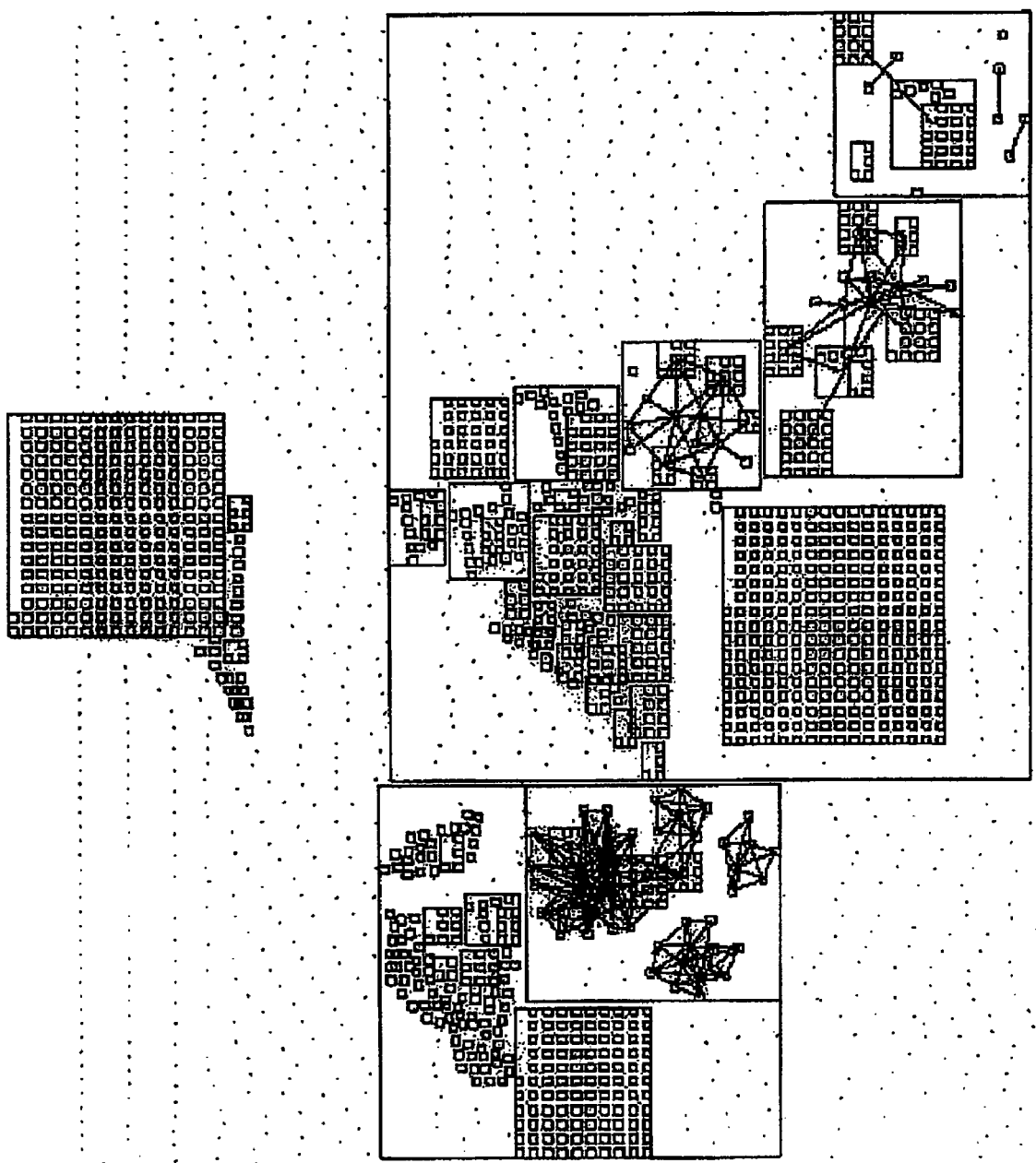
FIG. 17 is a view showing a state where, for clusters indicating pages concerning some projects of the Web pages shown in FIG. 13, arcs indicating a link structure between the pages are generated.

FIG. 17 is a view showing a state where, for clusters indicating pages concerning some projects of the Web pages shown in FIG. 13, arcs indicating a link structure between the pages are generated. Referring to the drawing, the link structure is clearly shown in some of the pages while the hierarchy structure shown in FIG. 13 is maintained.

Third Embodiment

In the first and second embodiments, in order to generate a graphics image showing the hierarchy structure of hierarchical data, rectangles (clusters or cells) indicating data elements (constituent elements) are arranged in descending order of size at places where the rectangles can be arranged. This technique adopts the policies of arranging the rectangles such that the data elements overlap each other as little as possible and arranging the rectangles so as not to leave spaces in order to efficiently utilize the screen space. As a result, the data elements are arranged on the display space as uniformly as possible. However, when such an arrangement method is employed, a proper graphics image cannot be generated in the case where there is a demand to make the arrangement while giving meanings to the positions of data elements on the screen to read the meaning and tendency of the entire data, or to make the arrangement such that similar arrangement results are obtained for data with similar meanings. Specifically, there are many cases where the very different arrangement results are obtained although the structures of data are very similar to each other. FIGS. 35A and 35B are views showing an example of generating graphics images in such a case. As shown in the drawings, for data of FIG. 35B which is obtained by removing only seven data elements from the hierarchical data of FIG. 35A having about 800 data elements, and so very similar to data of FIG. 35A, the very different arrangement result from that of FIG. 35A can be obtained.

The third embodiment introduces a template describing referential positions (arrangement positions roughly specified in advance), at which the clusters or cells to be arranged are desired to be arranged in the screen space. Rectangles indicating the clusters or cells are arranged based on this template. Therefore, it becomes possible to give meanings to the positions of data elements and to obtain similar arrangement results for data having similar meanings by creating the template according to an arbitrary rule and specifying the arrangement positions of the rectangles.

Figure 18:
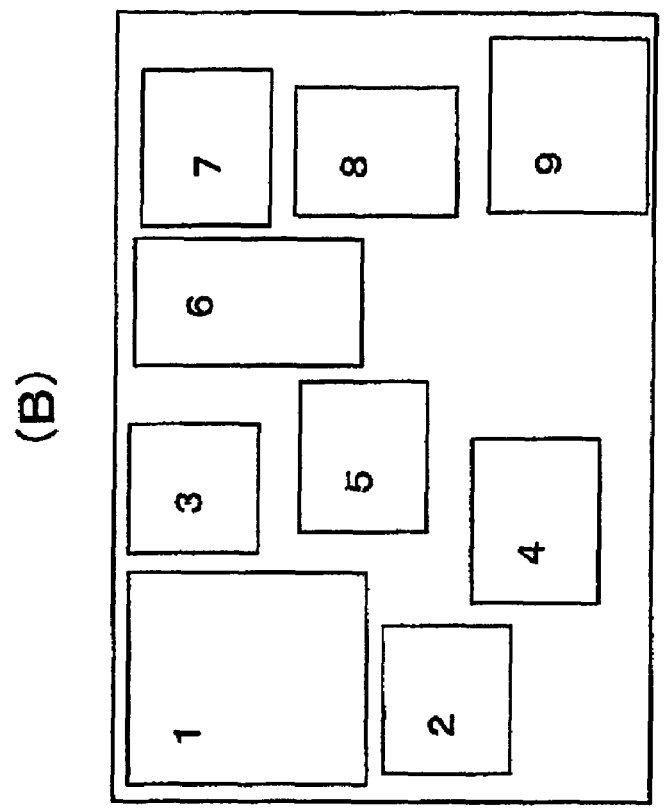
FIGS. 18A and 18B are views showing a concept of a template introduced in a third embodiment of the present invention.
Figure 18:
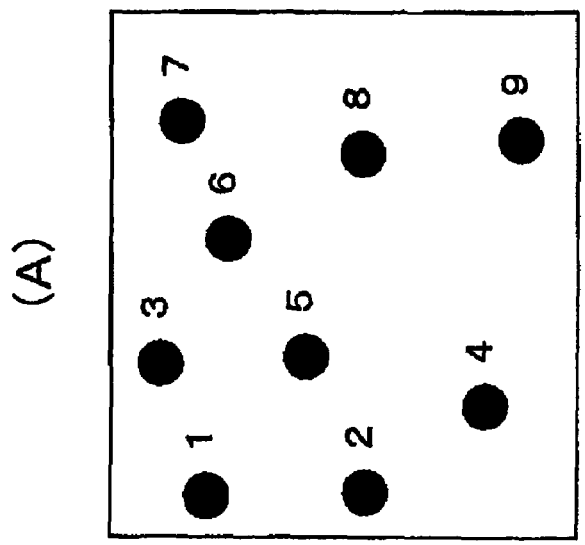

FIGS. 18A and 18B are views showing a concept of the template introduced in the third embodiment.

FIG. 18A shows an example of the template for a hierarchy level including nine constituent elements. The size of the template, which is position information of the constituent elements, is equivalent to the size of the arrangement region, and predetermined coordinates (x-y coordinates, for example) are set in the template. With these coordinate values, the positions where the constituent elements are to be arranged in the arrangement region can be specified. At the time of creating the template, the sizes of rectangles indicating the nine constituent elements may not be known. Moreover, it is allowed that the rectangle destiny varies in the arrangement on the template. FIG. 18B shows a result of arranging the nine rectangles which correspond to the respective constituent elements and have predetermined sizes based on the template. It can be understood that the rectangles are arranged while retaining the positional relationships therebetween described in the template as much as possible, not overlapping each other, and suppressing the expansion of the occupying space.

Figure 19:
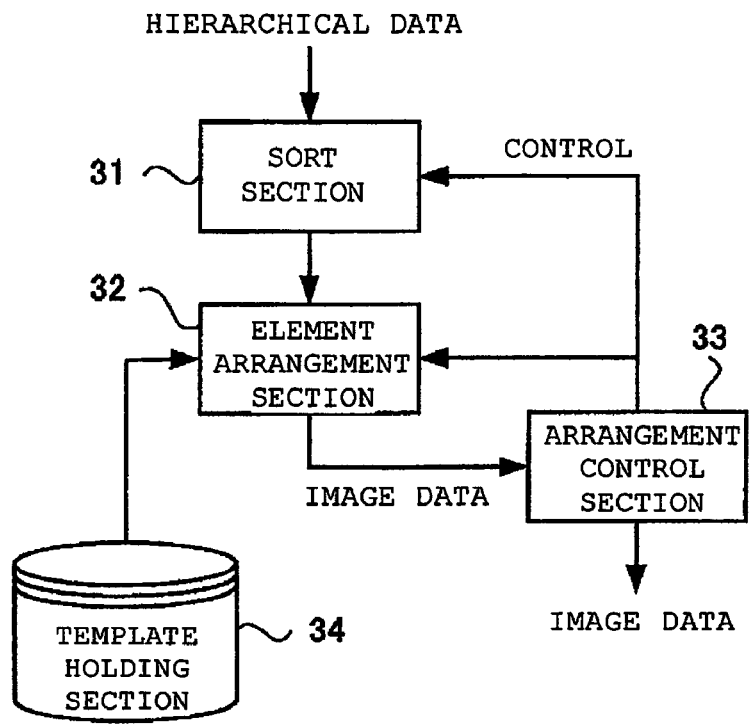
FIG. 19 is a diagram illustrating a configuration of a graphic image generation apparatus which generates a graphics image of hierarchical data according to the third embodiment.

FIG. 19 is a diagram illustrating a configuration of a graphics image generation apparatus according to the third embodiment, which generates a graphics image of hierarchical data.

The graphics image generation apparatus shown in FIG. 19 includes a sort section 31, an element arrangement section 32, an arrangement control section 33, and a template holding section 34. The sort section 31 determines an arrangement order concerning the constituent elements on each hierarchy level in graph data to be processed. The element arrangement section 32 arranges the constituent elements of the graph data in accordance with the order determined by the sort section 31. The arrangement control section 33 causes the sort section 31 and the element arrangement section 32 to recursively perform the arrangement processing of the constituent elements of the graph data sequentially from the lower hierarchy level of the graph data. The template holding section 34 holds a template referred to when the element arrangement section 32 arranges the constituent elements (rectangles).

The graphics image generation apparatus shown in FIG. 19 is implemented by the computer system 10 as shown in FIG. 1 similarly to the graphics image generation apparatus for the hierarchical data shown in FIG. 2. Specifically, the sort section 31, the element arrangement section 32, and the arrangement control section 33 shown in FIG. 19 are virtual software blocks implemented by the processing unit 11 which is controlled by the computer program held in the main memory 12 of FIG. 1. The computer program is provided by being stored in a storage medium such as a CD-ROM or a floppy disk to be distributed or by being transmitted via a network. The computer program is loaded in the main memory 12 and controls the processing unit 11 to implement a function of each component shown in FIG. 19 in the computer system 10 shown in FIG. 1. The template holding section 34 is implemented by the main memory 12 or the storage unit 15.

The third embodiment is similar to the first embodiment in that the graphics image of hierarchical data is generated by the technique for combining the regions indicating hierarchy levels in the nested manner. The cells and clusters constituting the graphics image generated in this embodiment have similar definitions to those in the first embodiment.

In the configuration shown in FIG. 19, when arranging clusters or cells on a lower hierarchy level than a predetermined cluster within a rectangle indicating the relevant predetermined cluster, the sort section 31 determines (sorts) the arrangement order of the clusters or cells.

Figure 20:
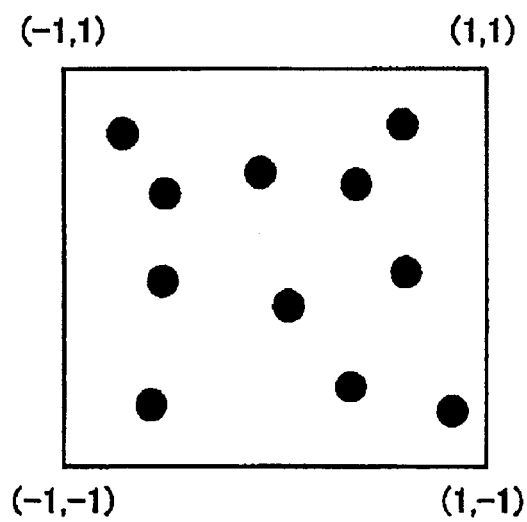
FIG. 20 is a view showing a state where coordinate values of four vertices of an arrangement region are normalized based on a template.

The arrangement order is determined based on the template. First, the coordinate values of the four vertices of the arrangement region (of the same size as the template) where the constituent elements are to be arranged are normalized into $(-1, -1)$, $(1, -1)$, $(1, 1)$, and $(-1, 1)$. This state is shown in FIG. 20. The arrangement order of the constituent elements whose arrangement positions are specified by the coordinate values of the template are determined in accordance with a predetermined criterion. The criterion for determining the arrangement order is properly set according to the meaning of the arrangement position of each constituent element which is specified by the template or the like. For example, the criterion may be the ascending order of the x coordinate values or the ascending order of the distance from the origin in the normalized coordinate values.

The constituent elements whose arrangement positions are not specified by the coordinate values of the template can be arranged, for example, in descending order of the rectangle area similarly to the first embodiment. A sort result showing the arrangement order of the clusters or the cells is temporarily stored in the main memory 12 or the register in the processing unit 11.

The element arrangement section 32 arranges the clusters or cells of the hierarchical data in the display space in accordance with the order sorted by the sort section 21, which is read from the main memory 12 or the like. The element arrangement section 32 determines the arrangement positions of the rectangles indicating these constituent elements based on the following criteria of judgment.

[Criterion 1] Position where the rectangle does not overlap the already arranged rectangles.
[Criterion 2] Position whose distance D from the reference position described in the template is as small as possible.
[Criterion 3] Position where the expanded amount S of an occupied region due to the arrangement of the relevant rectangle is as small as possible.

The space is searched for a position which, among these criteria, must satisfy the criterion 1 and satisfies the criteria 2 and 3 as much as possible. In this embodiment, the position where the value of $aD+bS$ (a and b are constants defined by the user) is the smallest is considered as a position which most satisfies the criteria 2 and 3. By properly setting a and b, it can be controlled which of the criterion 2 and 3 is given priority.

In order to implement the processing of rapidly searching for a space where the rectangle can be arranged, the element arrangement section 32 performs processing using triangular mesh which is composed of triangles satisfying the Delaunay condition and connects the center points of the rectangles similarly to the element arrangement section 22 of the first embodiment. Specifically, the element arrangement section 32 narrows the number of candidates for the position of the rectangle into a finite number with reference to the Delaunay triangular mesh, and then arranges the rectangle at the best position thereamong.

In arranging a cluster on a predetermined hierarchy level, similarly to the element arrangement section 22 of the first embodiment, the element arrangement section 32 retains the relative positional relationships between a rectangle indicating the relevant cluster and rectangles or squares indicating clusters or cells on a lower hierarchy level than the relevant cluster, which have been already arranged within the relevant cluster, in other words, handles the combination of these figures as a figure, and performs arrangement.

As described above, in the third embodiment, the rectangles are arranged by the technique used in the first embodiment with the addition of a condition of the position close to the reference position described in the template.

The arrangement control section 33 causes the sort section 31 and the element arrangement section 32 to recursively repeat the processing of arranging rectangles for each hierarchy level of the hierarchical data from the lowest hierarchy level to the higher hierarchy level, thus generating a graphics image of the entire hierarchical data. The generated graphics image is stored in the video memory 13 shown in FIG. 1 and displayed on the display unit 14.

The template holding section 34 holds the template which is referred to when the constituent elements are arranged by the element arrangement section 32. In this embodiment, it becomes possible to give meanings to the positions of the data elements and to obtain similar arrangement results for data having similar meanings by creating the template in accordance with an arbitrary rule as described above. The types of this template and the method of creating the template will be described in detail later.

Next, description will be given of processing of generating a graphics image of hierarchical data based on the above described configuration.

In this embodiment, first, the coordinate values of four vertices $v_1$, $v_2$, $v_3$, and $v_4$ of an arrangement region are set to $(-1, -1)$, $(1, -1)$, $(1, 1)$, and $(-1, 1)$, respectively. A diagonal is then drawn in this arrangement region to generate triangular mesh composed of two triangular mesh elements. This is set to the initial state of the triangular mesh in the present invention. The technique for making the triangular mesh finer thereafter while satisfying the Delaunay condition is the same as that described in the first embodiment (see FIGS. 3 and 4).

Figure 21:
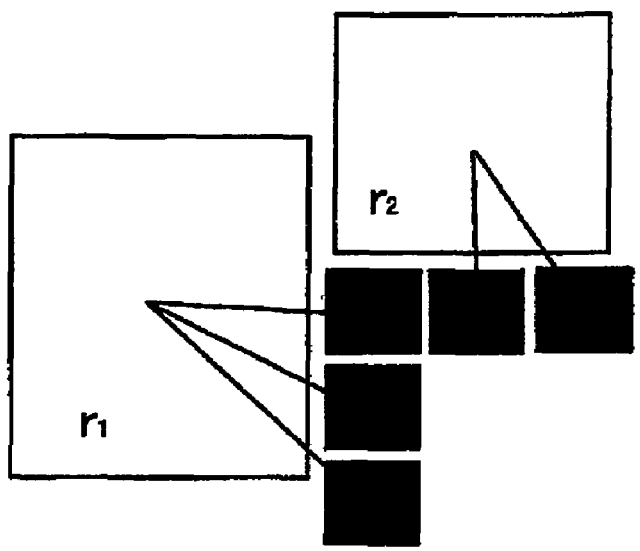
FIG. 21 is a view illustrating a method of arranging constituent elements according to this embodiment.

Subsequently, rectangles indicating constituent elements (hereinafter, referred to as just rectangles) are arranged within the inner region of the triangular mesh one by one in order. As previously described, in this embodiment, the arrangement order of the rectangles is determined based on the coordinate values of the template specifying the arrangement positions of the rectangles. As shown in FIG. 21, if rectangles $r_1$ and $r_2$ are already arranged, the next rectangle is arranged at the position close to the coordinate value in the template so as not to be spaced from the rectangles $r_1$ or $r_2$.

In this embodiment, the triangular mesh elements are sequentially extracted in ascending order of the distance from the coordinate value normalized on the template, and a plurality of candidate positions are set within each of the extracted triangular mesh elements. Subsequently, attempts are made at arranging a rectangle at the candidate positions. This is repeated for several extracted triangular mesh elements to identify the candidate position which satisfies the criterion 1 and has the minimum value of aD+bS, and the identified candidate position is determined as the arrangement position of the rectangle.

Figure 22:
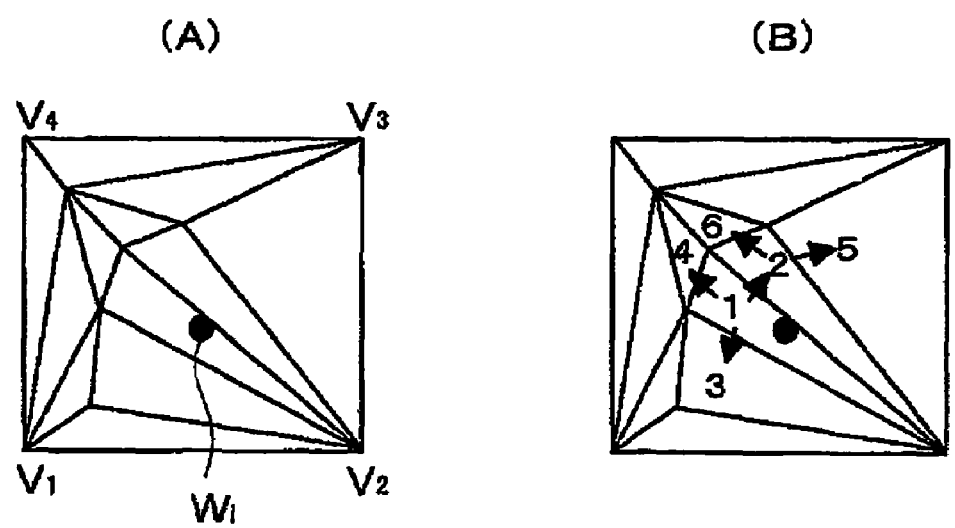
FIGS. 22A and 22B are views illustrating a method of extracting triangular mesh elements for determining the arrangement position of a rectangle.

FIGS. 22A and 22B are views illustrating a method of extracting the triangular mesh elements for determining the arrangement position of the rectangle.

As shown in FIG. 22A, first, a triangular mesh element containing the coordinate value of a rectangle to be newly arranged on the template is identified (see FIG. 22A). Taking this triangular mesh element as the starting point, triangular mesh elements are extracted by the breadth first search in the neighbor relationships (see FIG. 22B). The candidate positions of the rectangle are then calculated according to the order of extraction. Because the triangular mesh elements are treated in ascending order of the distance from the template coordinate value, the value of aD tends to increase with the progress of the processing. Therefore, in this embodiment, the repeating processing is terminated when the value of aD exceeds the minimum value of the aD+bS which is already recorded.

Figure 23:
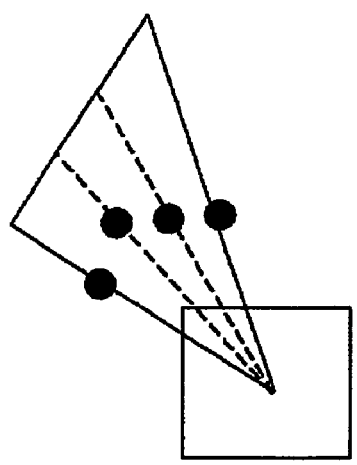
FIG. 23 is a view illustrating a method of obtaining candidate positions where a rectangle is arranged in an extracted triangular mesh element.
Figure 23:
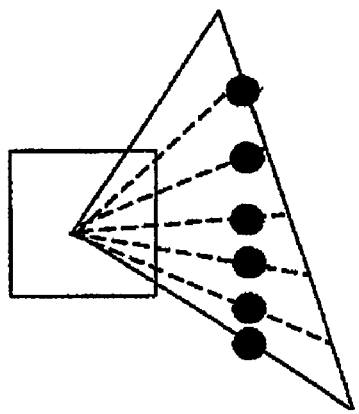
Figure 23:
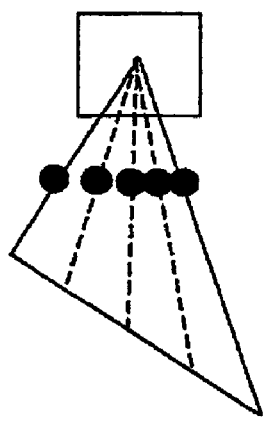

FIG. 23 is a view illustrating a method of obtaining candidate positions where a rectangle is arranged in an extracted triangular mesh element.

As shown in FIG. 23, in order to calculate the candidate arrangement positions of the rectangle, first, line segments connecting a vertex of the triangular mesh element and an opposite side thereto are generated at constant sampling intervals. A position on the line segments where the rectangle borders on an already arranged rectangle is set as a candidate position of the center point of the new rectangle, and an attempt is made at arranging the rectangle at this candidate position. There are m candidate positions within a certain triangular mesh element, the candidate positions are described as $c_1$ to $c_m$ in this disclosure. At this time, any one of the following processes is performed.

When a center point $v_{i+4}$ of a rectangle $r_i$ is arranged at a candidate position $c_j$, if the rectangle $r_i$ overlaps another rectangle already arranged, the rectangle is not arranged at the candidate position $c_j$.

The value of aD+bS at the candidate position $c_j$ is calculated. The area of the rectangular region, the total length of the four sides, or the like is used for the value of S. If the calculated value of aD+bS is the smallest among all the values calculated for the rectangle $r_i$, the value is recorded as $(aD+bS)_{min}$. Simultaneously, the candidate position $c_j$ is recorded as a position $c_{min}$.

The above process is repeated for each triangular mesh element. The center point $v_{i+4}$ of the rectangle is then arranged at the position $c_{min}$ recorded at the time of ending the repetition.

Next, a description will be given of processing of expanding the arrangement region for arranging a rectangle.

In this embodiment, the arrangement region is expanded by moving any of the four vertices $v_1$, $v_2$, $v_3$, and $v_4$ in the following two cases.

1) In the case where the rectangle $r_i$ arranged at the position $c_{min}$ which is, determined by the above described process protrudes from the arrangement region defined by the four vertices $v_1$, $v_2$, $v_3$, and $v_4$.

2) In the case where the position $C_{min}$ is not recorded at all. In other words, in the case where a candidate position that satisfies the criterion 1 is not found. In this case, after the region is expanded, the processes are performed again from the processing of calculating candidate positions.

Figure 24:
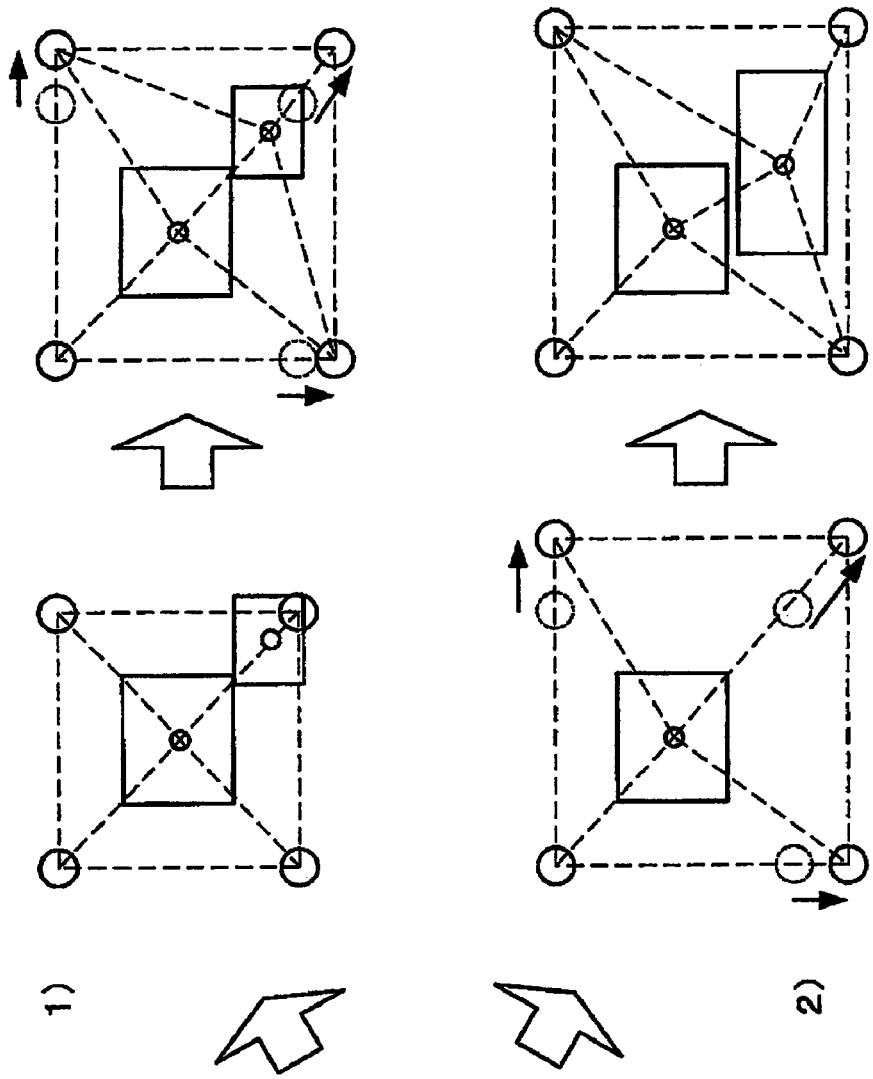
FIG. 24 is a view schematically showing a method of expanding an arrangement region in this embodiment.

FIG. 24 is a view schematically showing a method of expanding the arrangement region in the above two cases.

When the arrangement region is expanded, the coordinate values of the vertices of the triangular mesh on the template are normalized again.

In the above described manner, the graphics image is generated according to the arrangement of the rectangles based on the template. However, in the actual situation of generating a graphics image, rectangles to be arranged sometimes includes rectangles which are given coordinate values on the template and rectangles which are not given coordinate values. For example, when a design view for a graphics image to be generated is reflected on a template, there are data elements whose positions are specified by the template and data elements whose positions are not specified by the template in some cases; or In time series data, when an arrangement result at the last time point is used as a template, the coordinate values of newly added data elements are not described in the template.

In the above described situation, a case is conceived where the coordinate values are not described in the template.

In this case, the arrangement of all the groups of rectangles is determined by the following procedure.

1. First, a group of rectangles whose coordinate values are described in the template is collected, and the arrangement thereof is determined by the technique of this embodiment.

2. Subsequently, a group of rectangles whose coordinate values are not described in the template is collected, and the arrangements of these rectangles are determined in descending order of area by the algorithm of the first embodiment.

Figure 25:
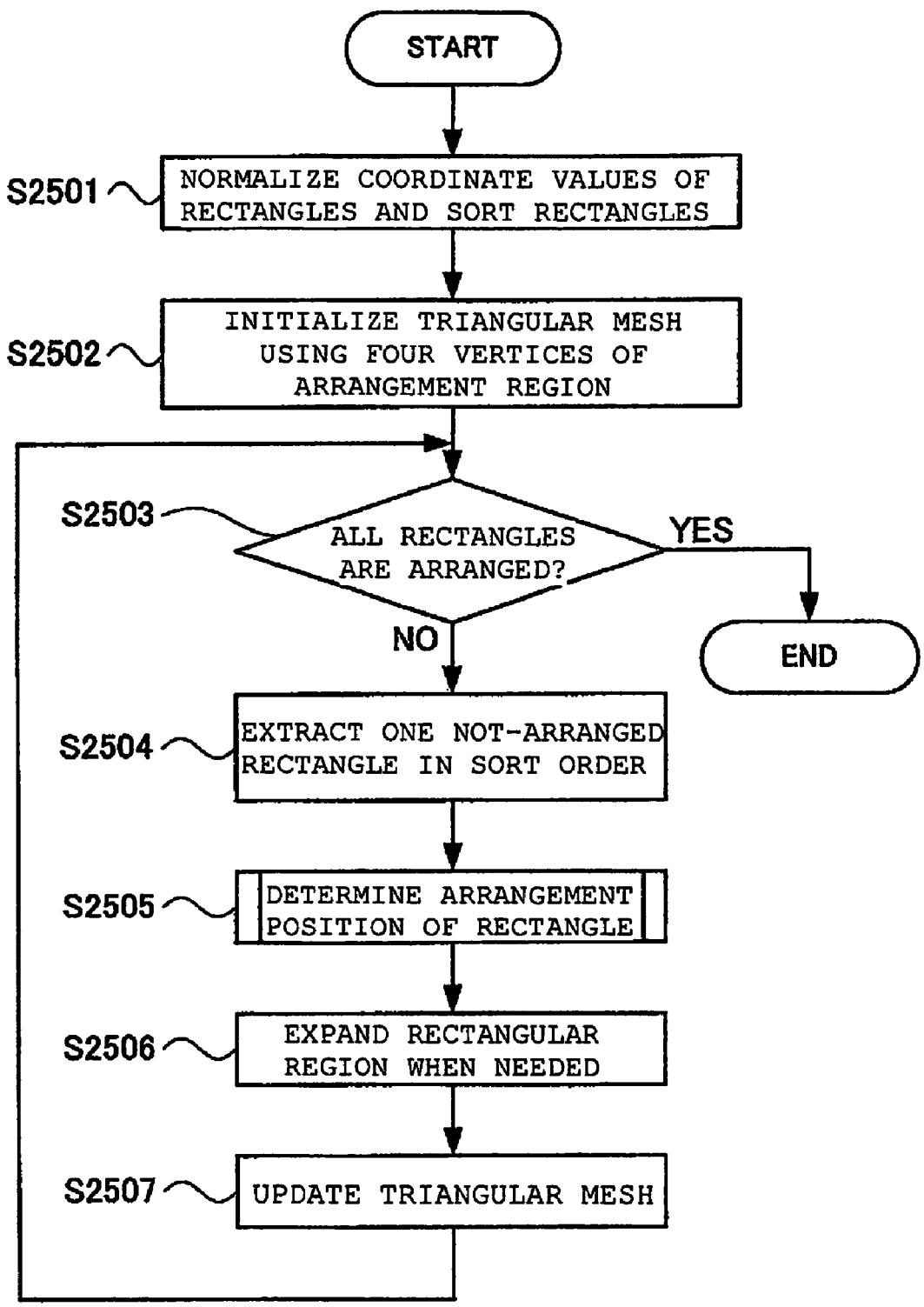
FIG. 25 is a flowchart illustrating a method of arranging a group of rectangles constituting a hierarchy level.
Figure 26:
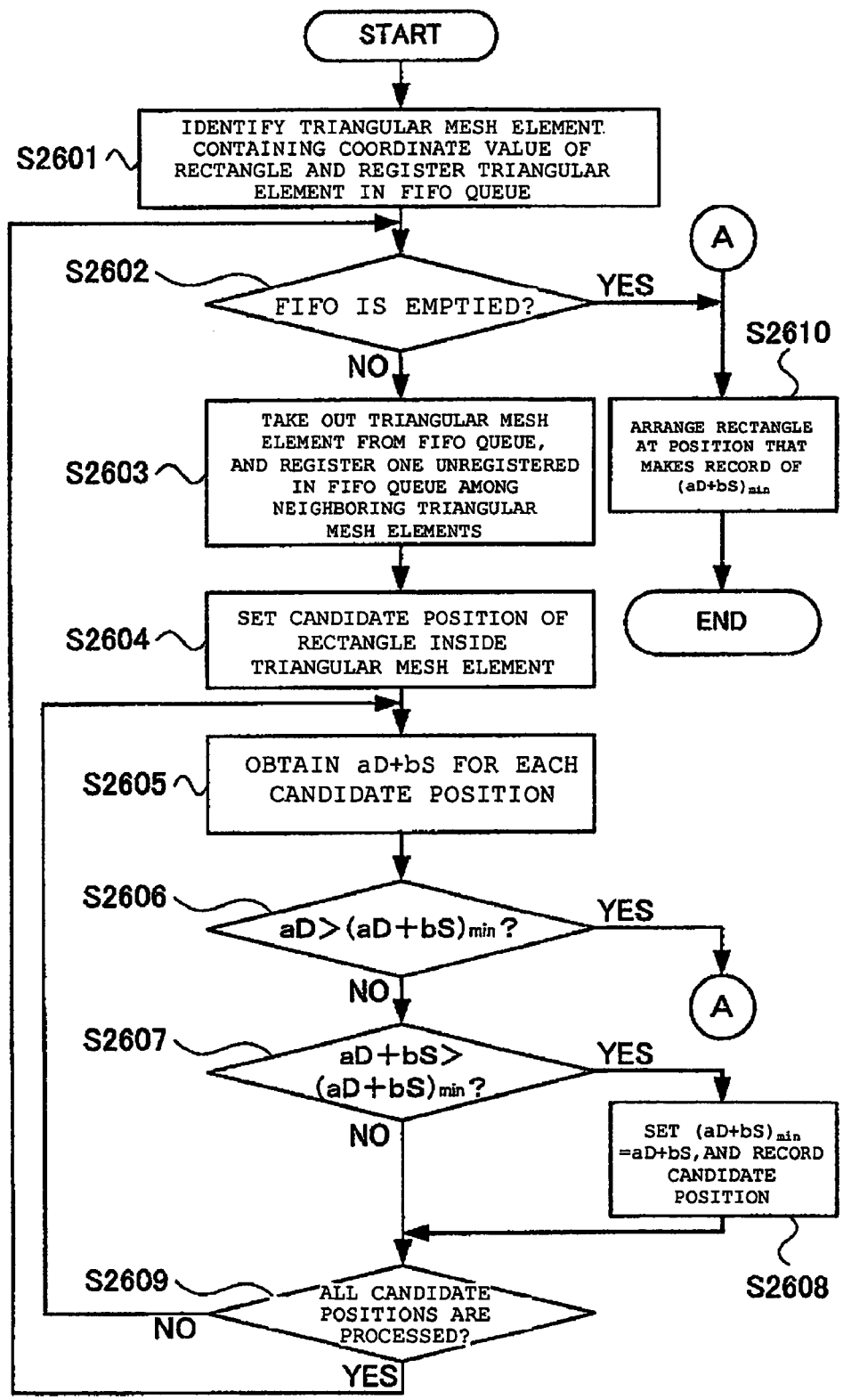
FIG. 26 is a flowchart illustrating a method of determining the arrangement position of a rectangle.
Figure 27:
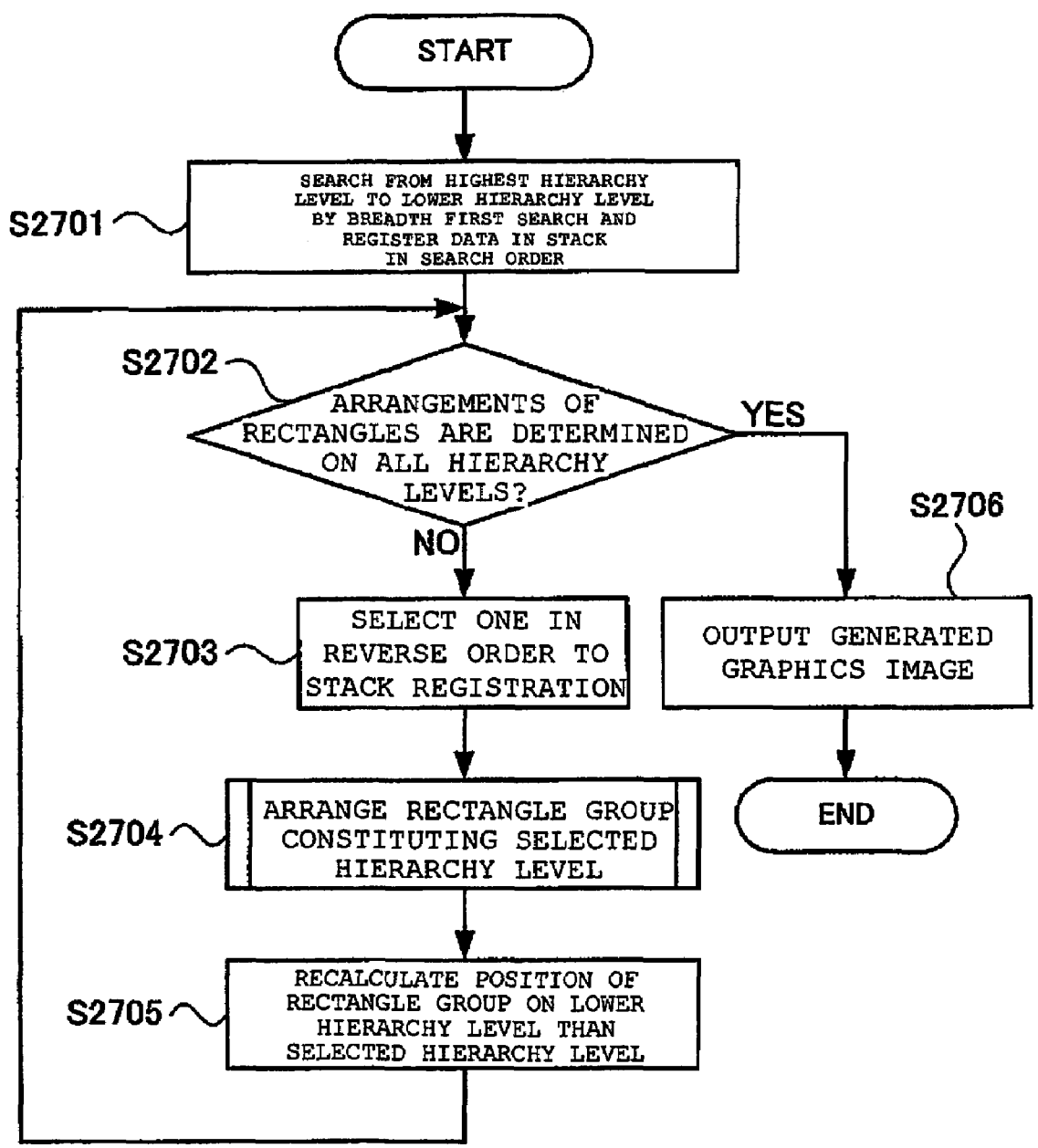
FIG. 27 is a flowchart illustrating processing of generating a graphics image of hierarchical data by the control of an arrangement control section.

Referring to FIGS. 25 to 27, a description will be given of a process flow of arranging rectangles according to this embodiment. FIG. 25 is a flowchart illustrating a method of arranging a group of rectangles constituting a hierarchy level. FIG. 26 is a flowchart illustrating a method of determining the arrangement position of a rectangle. FIG. 27 is a flowchart illustrating processing of generating a graphics image of hierarchical data by the control of the arrangement control section 33.

Referring to FIG. 25, first, the sort section 31 reads data of a hierarchy level where the processing of arranging rectangles is to be performed among hierarchical data to be processed from the main memory 12. The sort section 31 then collects rectangles whose coordinate values are described in the template, and normalizes the coordinate values. Subsequently, the sort section 31 sorts the rectangles according to a predetermined criterion based on the arrangement positions of data elements (constituent elements), such as the ascending order of the x coordinate value or the ascending order of the distance from the origin in the normalized coordinate values (step 2501). A sort result is temporarily stored in the main memory 12 or the register of the processing unit 11, and used by the element arrangement section 32.

Subsequently, the element arrangement section 32 reads the template which is referred to for the arrangement of the rectangles (constituent elements) from the template holding section 34, and sets the triangular mesh to the initial state using the four vertices of the arrangement region corresponding to the template (step 2502). The following series of processing is then applied to each rectangle $r_i$ to be arranged to determine the arrangement thereof (step 2503).

First, a rectangle which is not arranged yet is extracted according to the sort order by the sort section 31 (step 2504). The arrangement position of the rectangle is determined according to a procedure to be described later with reference to FIG. 26 (step 2505). The rectangular region is expanded when needed (step 2506). After the triangular mesh is updated, the procedure proceeds to the processing of arranging the next rectangle (step 2507).

When all the rectangles on the hierarchy level to be processed are arranged, the processing is ended (step 2503). The generated graphics image on the relevant hierarchy level is temporarily stored in the main memory 12 or the register of the processing unit 11, and used in generating a graphics image at the next hierarchy level.

Next, description will be given of processing of determining the arrangement position of the rectangle, which is performed in step 2505.

In order to arrange the rectangle extracted in the step 2504 of FIG. 25, first, a triangular mesh element $t_0$ containing a coordinate value $W_i$ of the rectangle $r_i$, which is described in the template, is identified, and the identified triangular mesh element $t_0$ is registered in a FIFO queue (step 2601). The following series of processing is then repeated until the FIFO queue is emptied (step 2602).

First, a triangular mesh element t is taken out of the FIFO queue. If there is a triangular mesh element that is not registered in the FIFO queue yet among triangular mesh elements adjacent to the triangular mesh element t, that triangular mesh element is registered in the FIFO queue (step 2603).

Subsequently, the candidate positions $c_1$ to $c_m$ are calculated within the triangular mesh element t, and the center point $v_{i+4}$ of the rectangle $r_i$ is arranged at the candidate positions on trial to make the following judgment (step 2604).

(a) The value of aD+bS is calculated for each candidate position (step 2605), and it is judged whether or not aD is greater than $(aD+bS)_{min}$ (step 2606). If aD is greater than $(aD+bS)_{min}$, $(aD+bS)_{min}$ is recorded, and the repetition processing is terminated. It is then determined that the center point $v_{i+4}$ of the rectangle $r_i$ is arranged at the corresponding position $c_{min}$, and the processing is finished (step 2610).

(b) If aD is not greater than $(aD+bS)_{min}$, in other words, if the rectangle $r_i$ overlaps another rectangle already arranged, next, it is judged whether the value of aD+bS is the smallest (step 2607). If this value is the smallest, the value is recorded as $(aD+bS)_{min}$, and simultaneously, the candidate position thereof is recorded as the position $c_{min}$ (step 2608).

When the judgments are made for all the candidate positions, the next triangular mesh element is selected, and the processing is repeated (steps 2609, 2602, and 2603). Note that, when aD is not greater than $(aD+bS)_{min}$ in the judgment of the step 2606, it may be judged that the rectangle cannot be arranged at that place, and the process may proceed to the step 2609 without making the judgment of the step 2607.

When the FIFO queue is emptied by repetition of the above mentioned processing, it is determined that the center point $v_{i+4}$ of the rectangle $r_i$ is arranged at the position $c_{min}$ making the record of $(aD+bS)_{min}$, and the processing is finished (step 2610).

When there are rectangles whose coordinate values are not described in the template, these rectangles are collected, and the arrangements thereof are determined by use of the algorithm (see FIGS. 7 and 8) disclosed in the first embodiment.

Next, description will be given of processing of arranging rectangles at each hierarchy level by the control of the arrangement control section 33 with reference to FIG. 27.

First, the hierarchical data to be processed is read from the main memory 12, and hierarchy levels are searched for the hierarchical data by the breadth first search beginning from the highest hierarchy level to lower hierarchy levels. The hierarchical data is registered in a stack in the search order (step 2701). The hierarchical data registered in the stack for each hierarchy level is selected one by one in the reverse order of the registration in the stack (step 2703). According to the procedure shown in FIGS. 25 and 26, a group of rectangles constituting the selected hierarchy level is arranged (step 2704).

As previously described, since this processing is recursively performed from the lower hierarchy level up to the higher hierarchy level of the hierarchical data, when a rectangle (cluster) on a predetermined hierarchy level is arranged, rectangles on the lower hierarchy levels than the predetermined level have already been arranged within the relevant rectangle. Accordingly, after the processing of the step 2704 is finished, the positions of the rectangles on the lower hierarchy levels than the arranged rectangle are recalculated (step 2705).

The processes of the steps 2703 to 2705 are performed on each hierarchy level. When the arrangements of the rectangles are determined on all the hierarchy levels, the graphics image, which is an arrangement result, is stored in the video memory 13 and outputted on the display unit 14 (steps 2702 and 2706).

Next, descriptio will be given of a method of creating a template used in the processing of arranging clusters or cells in this embodiment.

Figure 28:
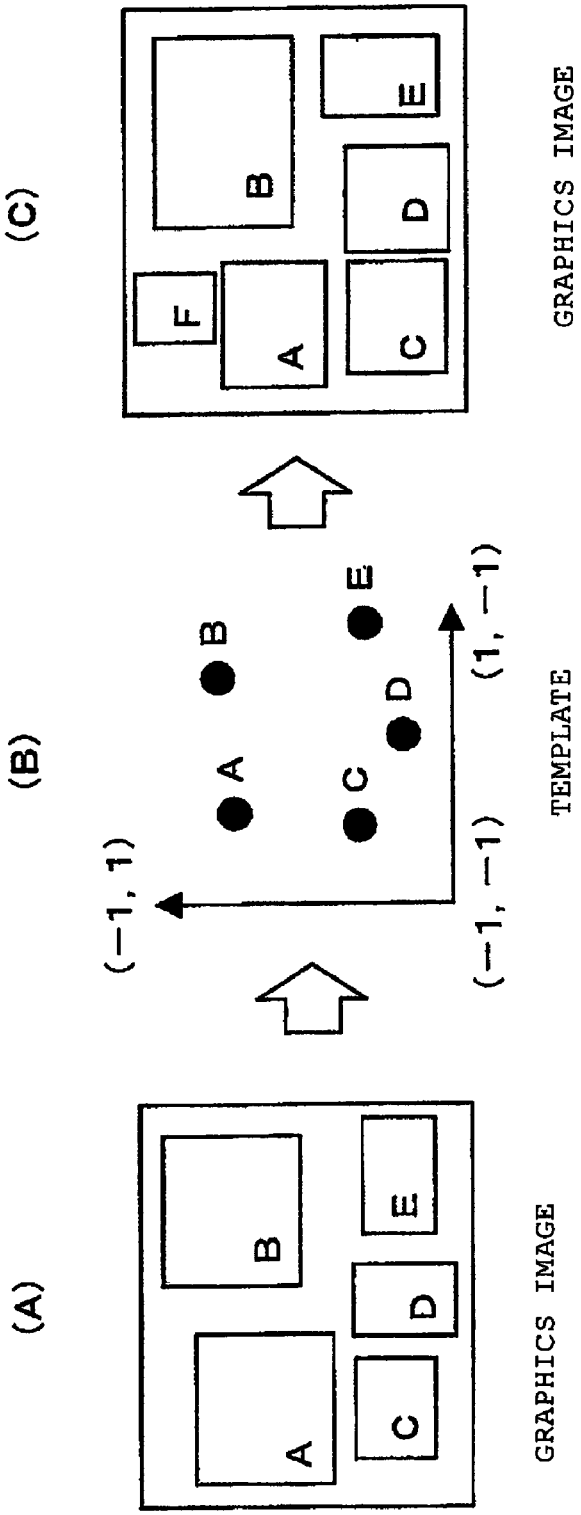
FIGS. 28A to 28C are views showing how a graphics image is updated by using a template for hierarchical data changing along time.

In generation of a target graphics image of this embodiment, in some cases, a seamless visualization result is desired to be obtained for data changing along the time series. However, in the case of updating the graphics image according to temporal change in the hierarchical data, if the arrangements of the constituent elements after the update are greatly changed from the arrangements of the corresponding constituent elements before the update, the target seamless visualization result cannot be obtained. Therefore, a new graphics image is generated using a last graphics image before the update according to this embodiment. FIGS. 28A to 28C are views showing how a graphics image is updated by use of such a template. Referring to FIGS. 28A to 28C, it is understood that the corresponding constituent elements before and after the update are arranged at substantially the same positions by generating the graphics image after update (FIG. 28C) based on the template (FIG. 28B) created from the graphics image before update. Accordingly, the seamless visualization results can be obtained before and after the update. Such a system is designed to include template creating means, as a function of the processing unit 11 program-controlled, which reads a position of each constituent element on each hierarchy level in the generated graphics image and associates the constituent element with normalized coordinates in each arrangement region to create a template. The created template is saved in the template holding section 34, and used when the graphics image is updated.

Figure 29:
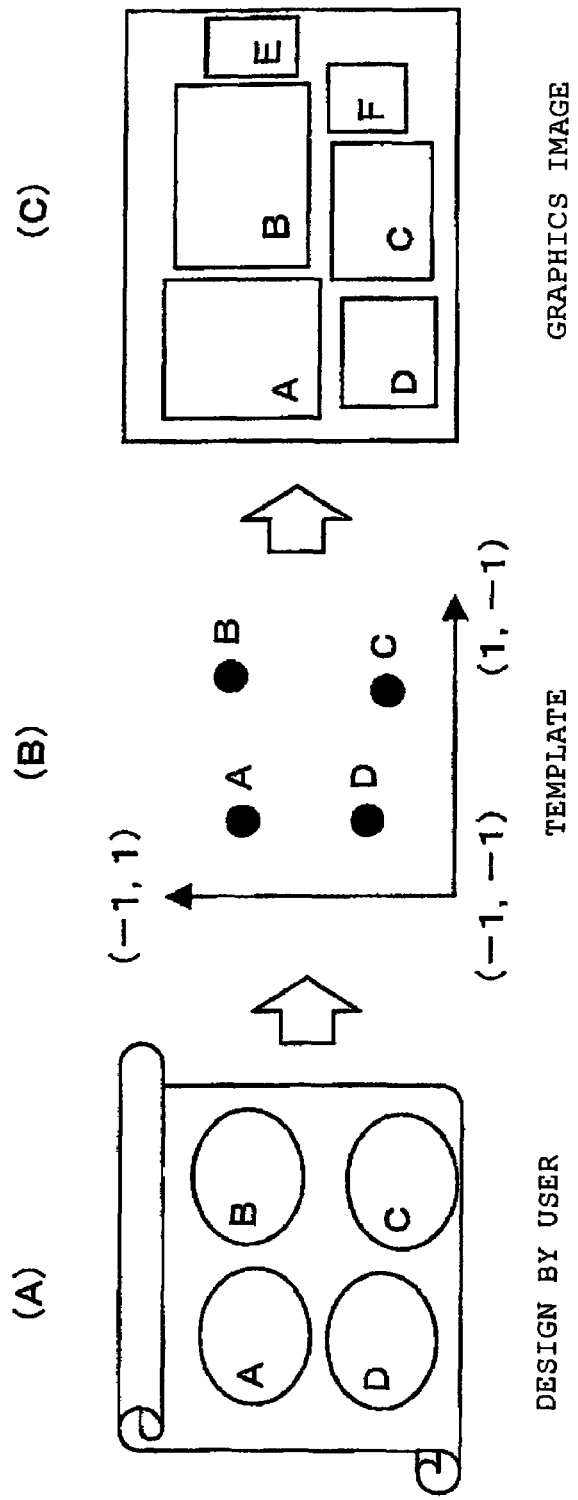
FIGS. 29A to 29C are views showing how a graphics image is generated by using a template reflecting a design view of a user.

In some cases, a user who desires the graphics image (hereinafter, referred to as just a user) has a design view about positional relationships between data elements, such as "this is arranged at the upper left" or "this is arranged at the lower right", and wants to obtain a visualization result on which the design view is reflected as much as possible. In this case, a graphics image is generated by using a template created based on the design view of the user according to this embodiment. FIGS. 29A to 29C are views showing a graphics image is generated by using such a template. Referring to FIGS. 29A to 29C, it is understood that the graphics image on which the design view of the user (rough positions of constituent elements A, B, C, and D) is reflected is generated by creating a template (FIG. 29B) based on a design (FIG. 29A) by the user and generating the graphics image (FIG. 29C) by use of this template. Such a system is designed to include template creation means, as a function of the processing unit 11 program-controlled, which displays a graphical user interface allowing the user to manually describe the design on the display unit 14, accepts input from the input devices such as a keyboard and a mouse, and creates the template. The created template is saved in the template holding section 34.

Figure 30:
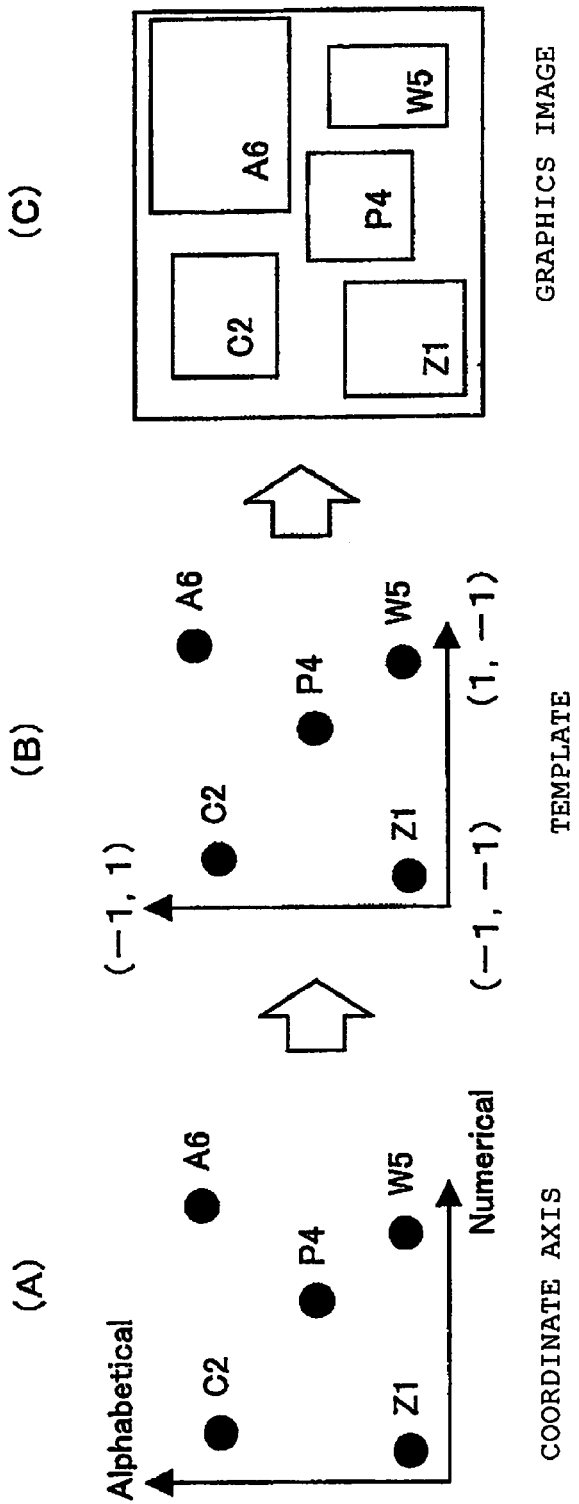
FIGS. 30A to 30C are views showing how a graphics image is generated by using a template based on predetermined coordinate axes.

Further in some cases, the visualization result is desired to be obtained with reference to meanings of data, for example, by arranging data elements in alphabetical order beginning from the left side or in descending order of date beginning from the top in the display space. In this case, coordinate axes which can reflect the meanings of data are defined, and the graphics image is generated by use of a template using such coordinate axes according to this embodiment. FIGS. 30A to 30C are views showing how the graphics image is generated by use of such a template. Referring to FIGS. 30A to 30C, it is understood that the graphics image which reflects the meanings of data on the arrangement positions can be generated in the following manner. The template (FIG. 30B) is generated based on a (alphabetical) coordinate axis extending from the top to the bottom in English alphabetical order and a (numerical) coordinate axis extending from the left to the right as a number increases (FIG. 30A), and the graphics image (FIG. 30C) is generated by using this template. Such a system is designed to include template generating means for translating predetermined coordinate axes into a template as a function of the processing unit 11 program-controlled. The generated template is saved in the template holding unit 34.

FIGS. 31A to 31C are views showing states where predetermined hierarchical data are graphically displayed according to this embodiment. FIG. 31B is a view showing a state where the hierarchical data of FIG. 31A is slightly changed and graphically displayed again without using a template (by the technique of the first embodiment). FIG. 31C is a view showing a state where the hierarchical data is graphically displayed again under the same condition using the graphics image of FIG. 31A as the template.

Comparing FIGS. 31A and 31B, although the data structures thereof are very similar, the visual impressions thereof are very different. On the other hand, FIGS. 31A and 31C are the graphics images visually very similar to each other because FIG. 31C uses FIG. 31A as the template.

Figure 32:
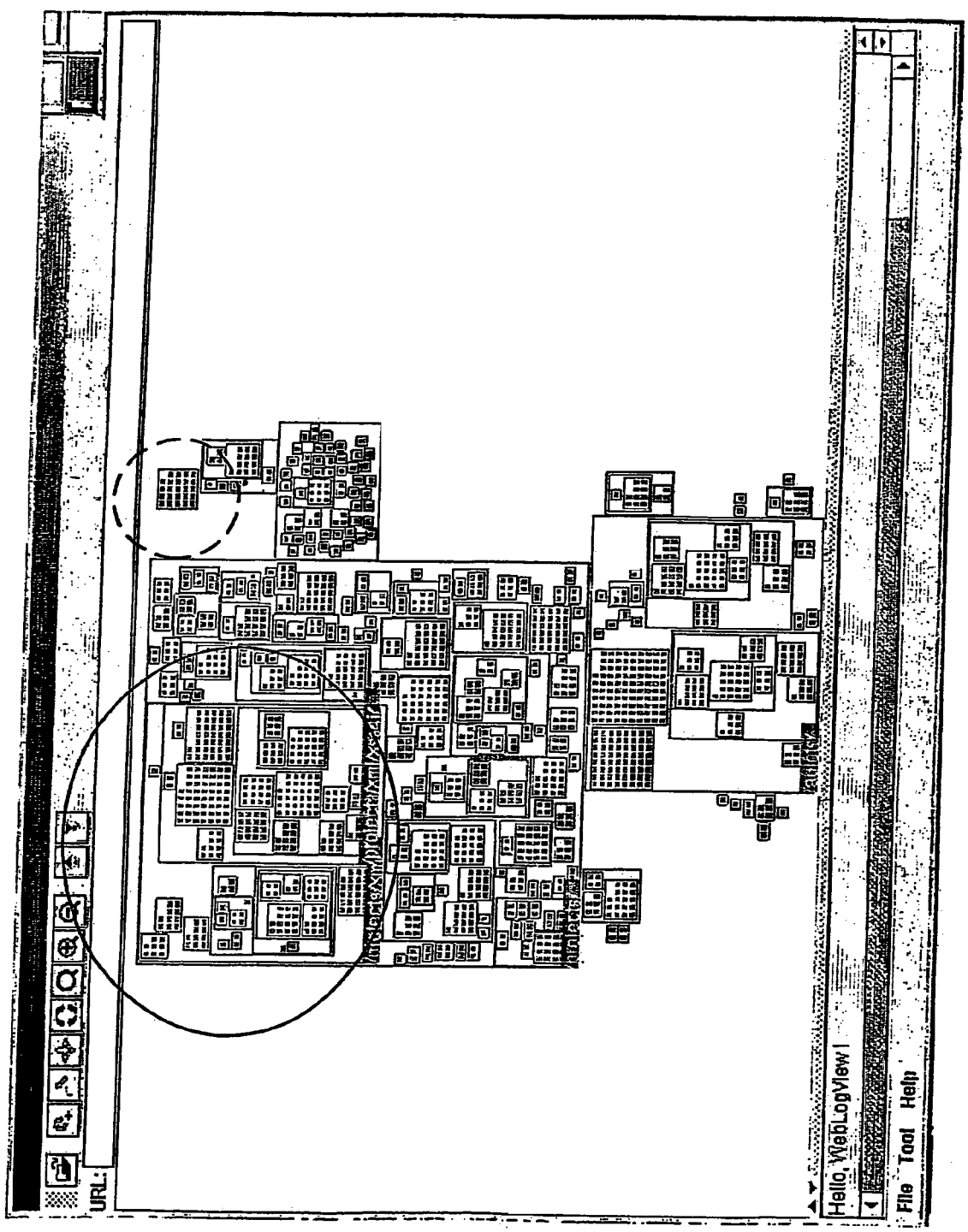
FIG. 32 is a view showing a state where predetermined Web pages are graphically displayed according to this embodiment by being handled as hierarchical data based on URL.
Figure 33:
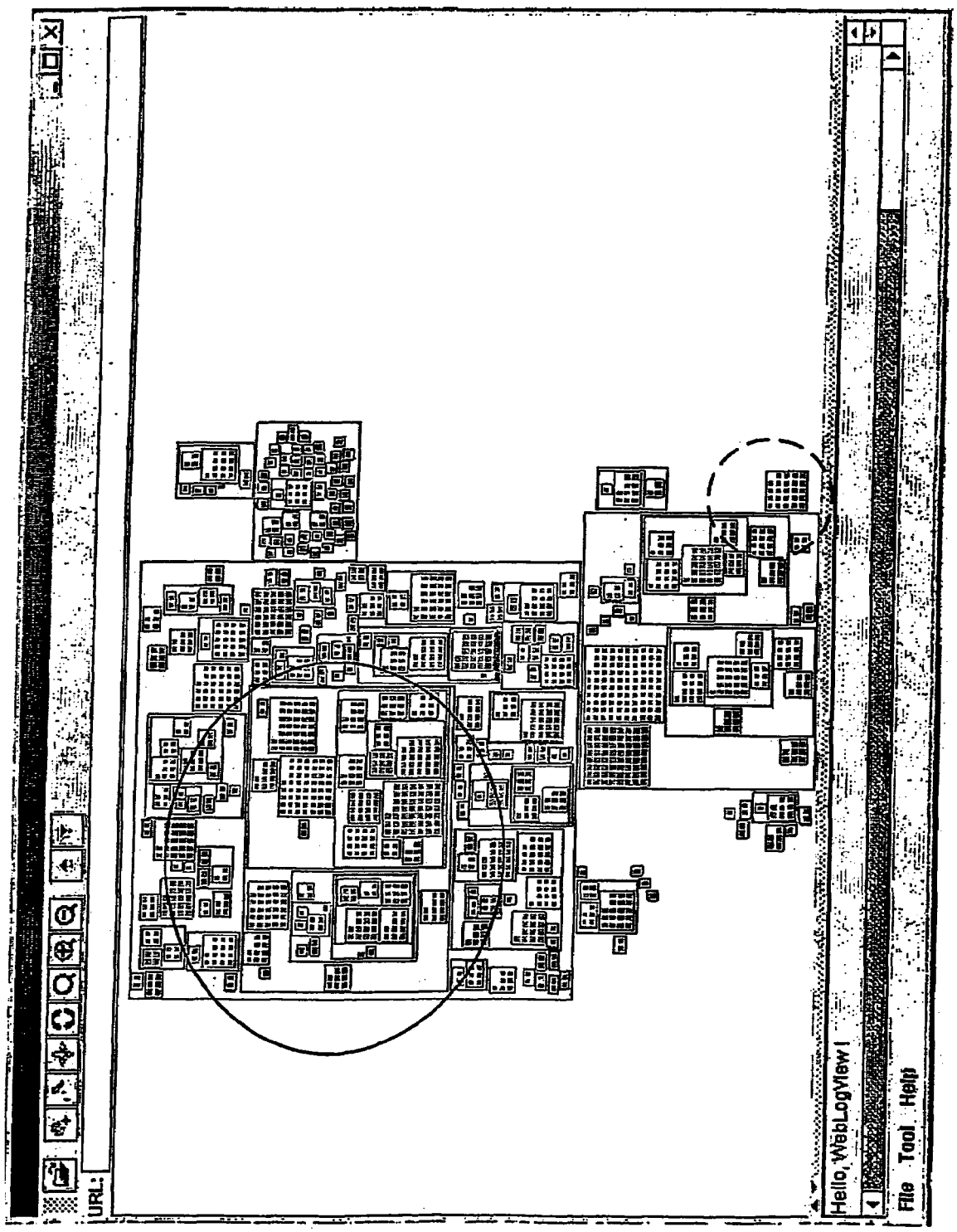
FIG. 33 is a view showing a state where the hierarchical data of FIG. 32 is slightly changed and graphically displayed again without using a template.
Figure 34:
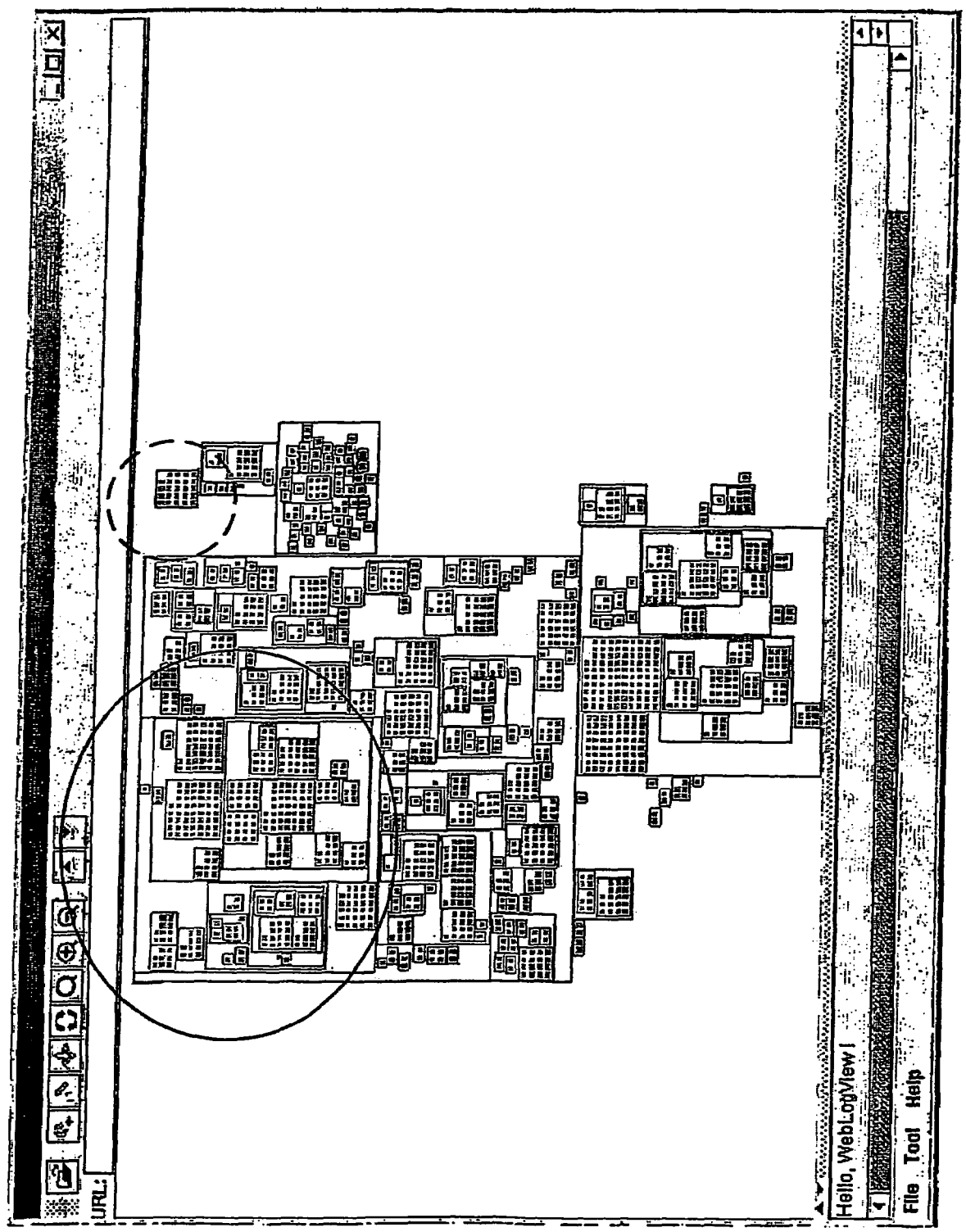
FIG. 34 is a view showing a state where the graphics image of FIG. 32 is graphically displayed again with the template under the same condition.
Figure 36:
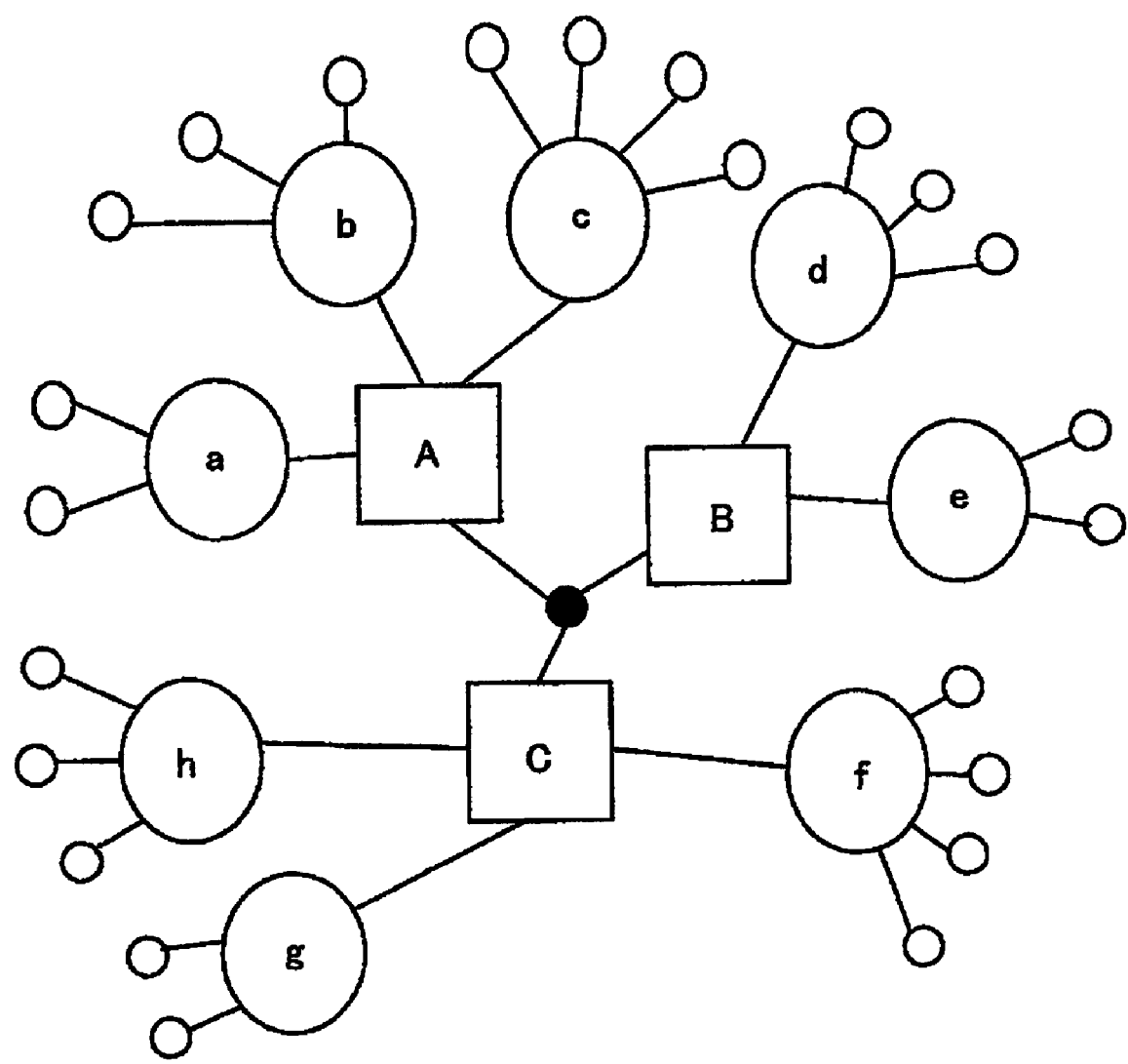
FIG. 36 is a view showing a display example of hierarchical data according to the conventional technology.

FIG. 32 is a view showing a state where predetermined Web pages are graphically displayed according to this embodiment by being handled as hierarchical data based on URL thereof. FIG. 33 is a view showing a state where the hierarchical data of FIG. 32 is slightly changed and graphically displayed again without using a template (by the technique of the first embodiment). FIG. 34 is a view showing a state where the hierarchical data is graphically displayed under the same condition using the graphics image of FIG. 32 as the template.

Comparing FIGS. 32 and 33, for example, the arrangements of the clusters in the regions surrounded by the solid lines and the positions of the clusters surrounded by the dashed lines are greatly different. On the other hand, in FIGS. 32 and 34, the same data are arranged at substantially the same positions.

In this embodiment, the description has been given of the technique for generating a graphics image by expressing hierarchical data by use of the nested structure and controlling the arrangement of the constituent elements (clusters or cells) on each hierarchy level by use of a template. However, it is obvious that this embodiment can be applied to graphics display of graph data with a hierarchy structure by connecting predetermined constituent elements with arcs as described in the second embodiment.

In each embodiment described above, the generated graphics image is displayed on the display unit 14 after being stored in the video memory 13. However, the graphics image stored in the video memory 13 can be utilized in a CAD (Computer Aided Design) system and the like.

Moreover, when squares indicating cells to be arranged or rectangles indicating clusters to be arranged are color-coded based on information added to the cells or clusters, it becomes possible to visualize the character and feature of each cluster.

Furthermore, in the aforementioned embodiments, the description has been given of the case of arranging rectangles of various sizes within a rectangular region. However, the shapes of constituent elements to be arranged are not limited to the rectangle. In the technique provided by these embodiments, the arrangement position of a figure is determined after a candidate arrangement position of the figure is selected by using triangular mesh, and the figure is actually arranged at the selected position to confirm whether the figure does not interfere with another already arranged figure. Accordingly, even with a figure in a shape other than the rectangle, a graphics image in which the hierarchy structure of data is expressed in the nested structure can be generated by being subjected to the same processes. However, compared with the case of using the rectangles, it becomes complicated to calculate the existence of interference and the center point (or identifiable point which can be a vertex of a new triangular mesh element) of the arranged figure in updating the triangular mesh. Accordingly, the time required for processing is increased. However, by using other shapes, it becomes possible to express the character and feature of each cluster or cell with a shape of the cluster or cell in addition to the aforementioned color coding.

Moreover, the means for adding and removing a cell or cluster to and from an already generated graphics image can be added to the graphics image generation apparatus of the embodiments, as the arc generation unit 24 is added in FIG. 14. In this case, the means for adding and removing constituent elements accepts an operation by a user to add a constituent element or to remove a desired constituent element, and adds a square or a rectangle at the corresponding position or removes a specified square or rectangle. When the rectangle to be removed includes constituent elements at a lower hierarchy level than the relevant rectangle, these constituent elements can be removed together, or only the specified rectangle can be removed while the constituent elements on the lower hierarchy level are left (in this case, only the hierarchy level of the relevant rectangle in the hierarchy structure is lost). If the positional relationships between squares or rectangles at the same hierarchy level are changed by the removal of the square or rectangle, the positional relationships between the squares or rectangles are adjusted by applying a proper rule (for example, a dynamics model which causes attractive and repulsive forces to act between the squares or rectangles).

The above described embodiments generate a graphics image of hierarchical data. However, in the case of generating a graphics image of hierarchical data with two hierarchy levels (data composed of data elements (cells) on the lowest hierarchy level and a cluster including all the data elements), each embodiment is equivalent to processing of efficiently arranging predetermined figures in a predetermined region.

Accordingly, it is possible to apply the embodiments in technical fields with such a requirement (for example, fields such as arrangement of VLSIs on a board, arrangement of patterns of clothes, and arrangement of mechanical parts on a plate). In this case, in general, figures are optimally arranged in a fixed region (so as to minimize waste space). Accordingly, this type of fields requires a technique of optimization how to arrange the figures without waste and attaches little importance to the shortening of time required for processing. However, when there is a demand that arrangement be performed in a short time while the arrangement result is not necessarily optimal in trial processing or the like, the technique for generating a graphics image of hierarchical data according to the embodiments can be applied.

INDUSTRIAL APPLICABILITY

As described above, according to the present invention, it is possible to easily generate a graphics image of large-scale data.

Moreover, according to the present invention, it is possible to rapidly perform processing of efficiently arranging elements of arbitrary sizes in a predetermined region.

The invention claimed is:

1. A graphics image generation apparatus, comprising:
    element arrangement means for, based on hierarchical data, arranging figures which indicate constituent elements on a lower hierarchy level than a constituent element on a predetermined level of the hierarchical data in a figure region which indicates the constituent element on the predetermined level; and
    arrangement control means for generating a graphics image of the hierarchical data by causing said element arrangement means to recursively perform arrangement of figures for each hierarchy level from a lower hierarchy level to a higher hierarchy level of the hierarchical data;
    wherein said arrangement of figures is accomplished by a first step of establishing the center point of one of said figures and two further points distant from said one figure to serve as vertices for construction of one triangle of a triangle mesh, and a second step of locating a center point of said one triangle to enable a positioning of a further one of said figures along a line connecting the center point of said one triangle with a vertex of said one triangle.

2. The graphics image generation apparatus according to claim 1, wherein said element arrangement means arranges figures such that related ones of the constituent elements are located close to each other.

3. The graphics image generation apparatus according to claim 1, wherein, when a predetermined one of the constituent elements is arranged, said element arrangement means handles a combination of a figure which indicates the predetermined constituent element and figures which are arranged within the predetermined constituent element and indicate constituent elements on a lower hierarchy level as one figure.

4. The graphics image generation apparatus according to claim 1, further comprising:
    arc creation means for generating an arc connecting the constituent elements constituting a predetermined hierarchy level in the hierarchical data, based on a relationship between the constituent elements.

5. The graphics image generation apparatus according to claim 1, further comprising:
    template holding means for holding a template identifying positions within the figure region,
    wherein said element arrangement means determines an arrangement position of a figure based on the template held in the template holding means and arranges the figure.

6. The graphics image generation apparatus according to claim 5, wherein the template is created based on a graphics image already generated.

7. The graphics image generation apparatus according to claim 5, wherein the template is created based on information concerning a positional relationship between constituent elements, the information being inputted by use of predetermined input means.

8. The graphics image generation apparatus according to claim 5, wherein the template is created based on predetermined coordinate axes expressing meanings of data with a positional relationship.

9. A graphics image generation apparatus which generates a graphics image including figures arranged within a predetermined region, the apparatus comprising:
    sort means for sorting figure data to be arranged based on a figure area; and
    element arrangement means for sequentially arranging figures based on the figure data from a center of the region to a periphery thereof in sort order sorted by said sort means;
    wherein said arranging of figures is accomplished by a first step of establishing the center point of one of said figures and two further points distant from said one figure to serve as vertices for construction of one triangle of a triangular mesh, and a second step of locating a center point of said one triangle to enable a positioning of a further one of said figures along a line connecting the center point of said one triangle with a vertex of said one triangle.

10. The graphics image generation apparatus according to claim 9, wherein
    said sort means modifies, based on a relationships given to the figure data, the order of the figure data sorted based on the figure area, and
    said element arrangement means arranges related ones of the figures so as to locate close to each other.

11. The graphics image generation apparatus according to claim 9, wherein said element arrangement means generates triangular mesh including center points of figures already arranged as vertices in the region, and determines an arrangement position of a figure to be next arranged based on sizes of triangular elements of the triangular mesh.

12. A graphics image generation apparatus, comprising:
    graphics image generation means for receiving hierarchical data and generating image data of a graphics image which expresses a hierarchy structure of the hierarchical data by use of a nested structure of two-dimensional figures;
    storage means for storing the image data of the graphics image of the hierarchical data, the image data being generated by said graphics image generation means; and
    display means for reading the image data from said storage means and displaying the read image data;
    wherein said generating of image data is accomplished by a first step of establishing the center point of one of said figures and two further points distant from said one figure to serve as vertices for construction of one triangle of a triangular mesh, and a second step of locating a center point of said one triangle to enable a positioning of a further one of said figures along a line connecting the center point of said one triangle with a vertex of said one triangle.

13. A graphics image generation apparatus which generates a graphics image including figures arranged within a predetermined region, comprising:

position information holding means for holding information concerning arrangement positions of figures, the information being created based on a graphics image already generated; and element arrangement means for arranging the figures in the region based on the information concerning the arrangement positions of the figures, the information being held in said position information holding means, such that the figures to be arranged do not overlap each other;

wherein said arranging of the figures is accomplished by a first step of establishing the center point of one of said figures and two further points distant from said one figure to serve as vertices for construction of one triangle of a triangular mesh, and a second step of locating a center point of said one triangle to enable a positioning of a further one of said figures along a line connecting the center point of said one triangle with a vertex of said one triangle.

14. A graphics image generation apparatus which generates a graphics image including figures arranged within a predetermined region, comprising:

position information holding means for holding information concerning arrangement positions of figures, the information being created based on predetermined design information; and element arrangement means for arranging the figures in the region based on the information concerning the arrangement positions of the figures, the information being held in said position information holding means, such that the figures to be arranged do not overlap each other;

wherein said arranging of the figures is accomplished by a first step of establishing the center point of one of said figures and two further points distant from said one figure to serve as vertices for construction of one triangle of a triangular mesh, and a second step of locating a center point of said one triangle to enable a positioning of a further one of said figures along a line connecting the center point of said one triangle with a vertex of said one triangle.

15. A graphics image generation apparatus which generates a graphics image including figures arranged within a predetermined region, comprising:

position information holding means for holding information concerning arrangement positions of figures, the information being created based on predetermined coordinate axes which expresses meanings of data by a positional relationship; and element arrangement means for arranging the figures in the region based on the information concerning the arrangement positions of the figures, the information being held in said position information holding means, such that the figures to be arranged do not overlap each other;

wherein said arranging of the figures is accomplished by a first step of establishing the center point of one of said figures and two further points distant from said one figure to serve as vertices for construction of one triangle of a triangular mesh, and a second step of locating a center point of said one triangle to enable a positioning of a further one of said figures along a line connecting the center point of said one triangle with a vertex of said one triangle.

16. A graphics image generation method of generating a graphics image including figures within a predetermined region by controlling a computer, the method comprising the steps of:

reading figure data to be arranged from a storage unit storing the figure data, sorting the figure data based on figure areas, and storing the sorted figure data in sort result storing means;

generating triangular mesh in the region;

reading a sort order of the figure data from the sort result storing means, sequentially setting figures based on the figure data as objects to be arranged in accordance with the sort order, determining arrangement positions of the figures based on triangular elements of the triangular mesh, and arranging the figures as the objects to be arranged at the arrangement positions; and storing a graphics image obtained by arranging the figures in the region into image data storing means;

wherein said determining of arrangement positions of the figures is accomplished by a first step of establishing the center point of one of said figures and two further points distant from said one figure to serve as vertices for construction of one triangle of said triangular mesh, and a second step of locating a center point of said one triangle to enable a positioning of a further one of said figures along a line connecting the center point of said one triangle with a vertex of said one triangle.

17. The graphics image generation method according to claim 16, wherein the step of arranging the figures includes the steps of:

determining an arrangement position of a figure based on sizes of the triangular elements; and arranging one of the figures as the objects to be arranged at the determined arrangement position and judging whether a judgment condition for judging possibility of the arrangement is satisfied, wherein when the judgment condition is not satisfied, said two steps are recursively performed.

18. The graphics image generation method according to claim 17, wherein, in the step of determining the arrangement position of the figure, the triangular elements of the triangular mesh are selected in descending order of size and set to the arrangement position of the figure as the object to be arranged.

19. The graphics image generation method according to claim 18, wherein, in the step of determining the arrangement position of the figure, among the triangular elements of the triangular mesh, a triangular element including fewer vertices that correspond to vertices of the region is sequentially selected as the arrangement position of the figure as the object to be arranged.

20. The graphics image generation method according to claim 17, wherein, in the step of arranging the figure, after the figure is newly arranged, the triangular mesh is updated by generating a new triangular element while using a predetermined point of the newly arranged figure as a new vertex of the new triangular element, and the arrangement position of a next figure is determined based on the updated triangular mesh.

21. A graphics image generation method of generating a graphics image including figures arranged within a predetermined region by controlling a computer, the method comprising the steps of:

reading figure data to be arranged from a storage unit storing the figure data, sorting the read figure data on the basis of a predetermined rule based on previously specified arrangement positions of figures, and storing the sorted figure data in sort result storing means;

generating triangular mesh in the region;

reading a sort order of the figure data from the sort result storing means, sequentially setting figures based on the figure data as objects to be arranged in accordance with the sort order, determining arrangement positions of the figures based on the previously specified arrangement positions of the figures and triangular elements of the triangular mesh, and arranging the figures as the objects to be arranged at the arrangement positions; and storing a graphics image obtained by arranging the figures in the region into image data storing means;

wherein said determining of arrangement positions of the figures is accomplished by a first step of establishing the center point of one of said figures and two further points distant from said one figure to serve as vertices for construction of one triangle of said triangular mesh, and a second step of locating a center point of said one triangle to enable a positioning of a further one of said figures along a line connecting the center point of said one triangle with a vertex of said one triangle.

22. A storage medium having a program capable of controlling a computer to generate a graphics image, the program causing the computer to execute:

processing of receiving hierarchical data and stacking constituent elements of the hierarchical data into data storing means based on a hierarchy structure of the hierarchical data;

processing of recursively executing, from a lower hierarchy level to a higher hierarchy level of the hierarchical data, processing of sequentially reading the constituent elements stacked in the data storing means and arranging figures indicating constituent elements on a lower hierarchy level than the read constituent elements in a figure region which indicate the read constituent elements; and processing of storing a graphics image of the hierarchical data obtained by recursively executing arrangement of the figures, into image data storing means;

wherein said executing of an arrangement of the figures is accomplished by a first step of establishing the center point of one of said figures and two further points distant from said one figure to serve as vertices for construction of one triangle of a triangular mesh, and a second step of locating a center point of said one triangle to enable a positioning of a further one of said figures along a line connecting the center point of said one triangle with a vertex of said one triangle.

23. The storage medium having a program according to claim 22, wherein the processing of arranging the figures indicating the constituent elements on the lower hierarchy level in the figure region includes:

processing of sorting figures to be arranged based on an area thereof and storing a sort result in sort result storing means; and processing of sequentially arranging the figures in accordance with the sort result read from the sort result storing means.

24. The storage medium having a program according to claim 22, wherein the process of arranging figures indicating the constituent elements on the lower hierarchy level in the figure region includes:

processing of sorting figures to be arranged while reflecting relationships given to the constituent elements on sorting and storing a sort result in sort result storing means; and processing of arranging related ones of the figures so as to locate close to each other in accordance with the sort result read from the sort result storing means.

25. The storage medium having a program according to claim 22, further causing the computer to execute:

processing of generating an arc, based on a relationship between the constituent elements, for the figures indicating the constituent elements which constitute a predetermined hierarchy level in a graphics image of the hierarchical data, the graphics image being obtained by recursively executing the arrangement of the figures.

26. The storage medium having a program according to claim 22, wherein in the processing of the program of arranging the figures which indicate constituent elements at a lower hierarchy level in the figure region, arrangement positions of the figures are determined based on a template for identifying positions within the figure region, and the figures are arranged.

* * * * *